(12) United States Patent
Hessel et al.

(10) Patent No.: US 12,439,863 B2
(45) Date of Patent: Oct. 14, 2025

(54) GREENHOUSE CONTROL SYSTEM

(71) Applicant: GROWPONICS GREENHOUSE TECHNOLOGY LTD., Kiryat Bialik (IL)

(72) Inventors: Lior Hessel, Kiryat Bialik (IL); Amos Daskal, Haifa (IL); Ohad Hessel, Lavon (IL); Assaf Shemesh, Haifa (IL); Assaf Yarden, Kfar Daruch (IL); Yuri Belilovsky, Kiryat Bialik (IL); Greggory Galaktionov, Kiryat Motzkin (IL)

(73) Assignee: GROWPONICS GREENHOUSE TECHNOLOGY LTD., Kiryat Bialik (IL)

( * ) Notice: Subject to any disclaimer, the term of this patent is extended or adjusted under 35 U.S.C. 154(b) by 70 days.

(21) Appl. No.: 18/442,350

(22) Filed: Feb. 15, 2024

(65) Prior Publication Data

US 2024/0298582 A1    Sep. 12, 2024

Related U.S. Application Data

(63) Continuation of application No. 17/047,142, filed as application No. PCT/IB2019/053121 on Apr. 16, 2019, now Pat. No. 12,035,665.

(60) Provisional application No. 62/773,210, filed on Nov. 30, 2018, provisional application No. 62/657,951, filed on Apr. 16, 2018.

(51) Int. Cl.
| | |
|---|---|
| A01G 9/14 | (2006.01) |
| A01G 7/00 | (2006.01) |
| A01G 31/02 | (2006.01) |
| F16M 11/12 | (2006.01) |
| G06T 7/00 | (2017.01) |

(52) U.S. Cl.
CPC ......... *A01G 9/143* (2013.01); *A01G 31/0232* (2025.01); *G06T 7/0004* (2013.01); *A01G 7/00* (2013.01); *F16M 11/12* (2013.01); *G06T 2207/30188* (2013.01)

(58) Field of Classification Search
CPC ...... A01G 9/143; A01G 31/0232; A01G 7/00; G06T 7/0004; G06T 2207/30188; F16M 11/12
See application file for complete search history.

(56) References Cited

U.S. PATENT DOCUMENTS 12,035,665 B2 * 7/2024 Hessel ................ G05D 1/0246
2009/0016826 A1 * 1/2009 Carpenter ............ E02D 17/202
405/302.6

* cited by examiner

*Primary Examiner* — Michelle Lopez
(74) *Attorney, Agent, or Firm* — Rivka Friedman

(57) ABSTRACT

The present invention is directed to computerized agricultural systems and methods for controlling and managing plant development, from seeding through harvest, in greenhouses and other agricultural production facilities.

7 Claims, 20 Drawing Sheets

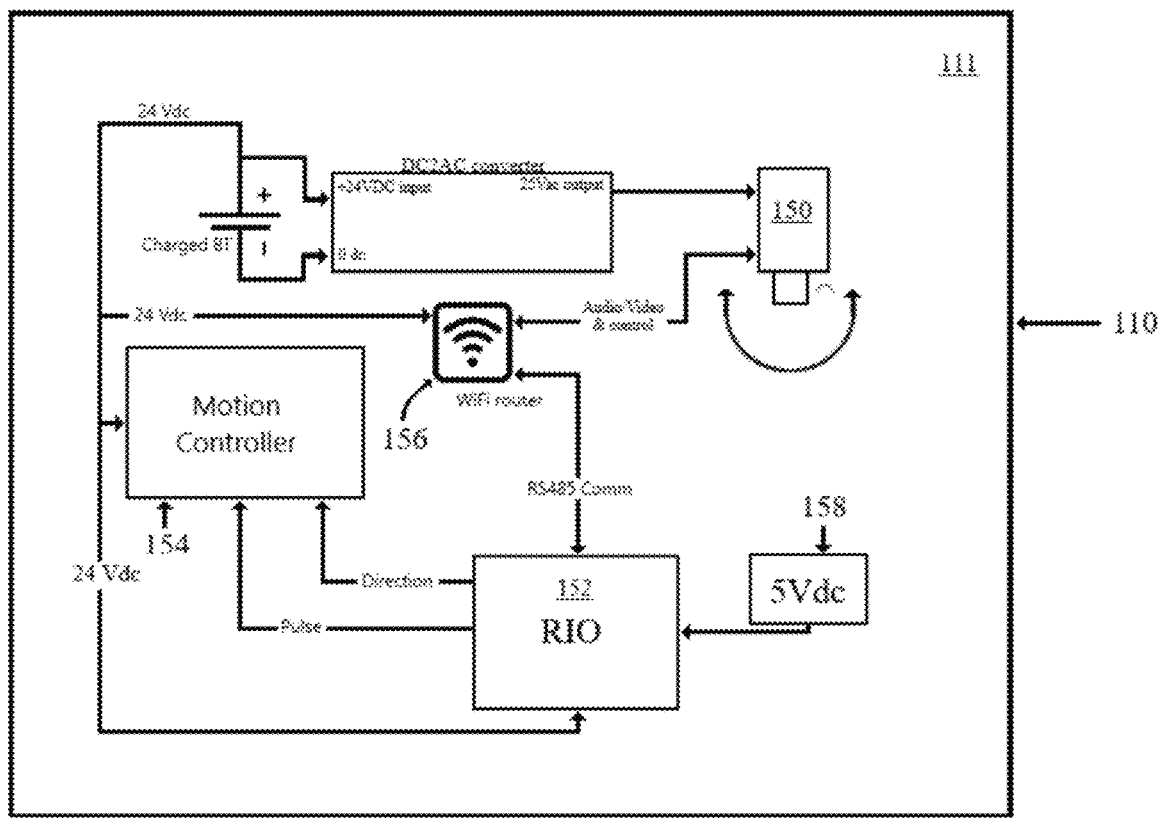
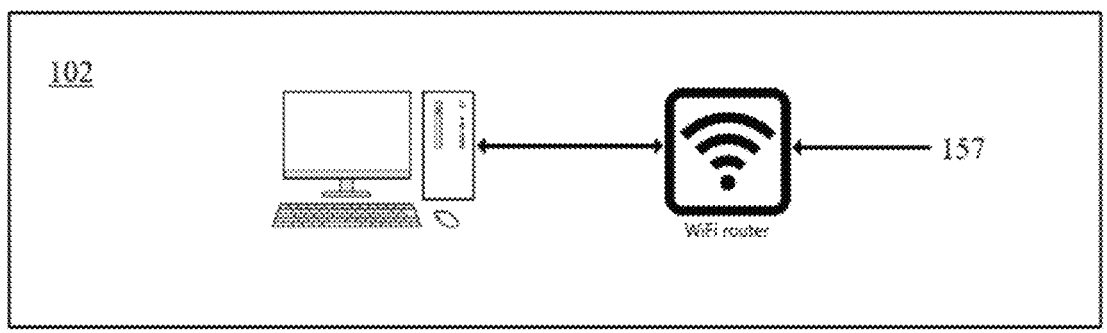
FIG. 2B

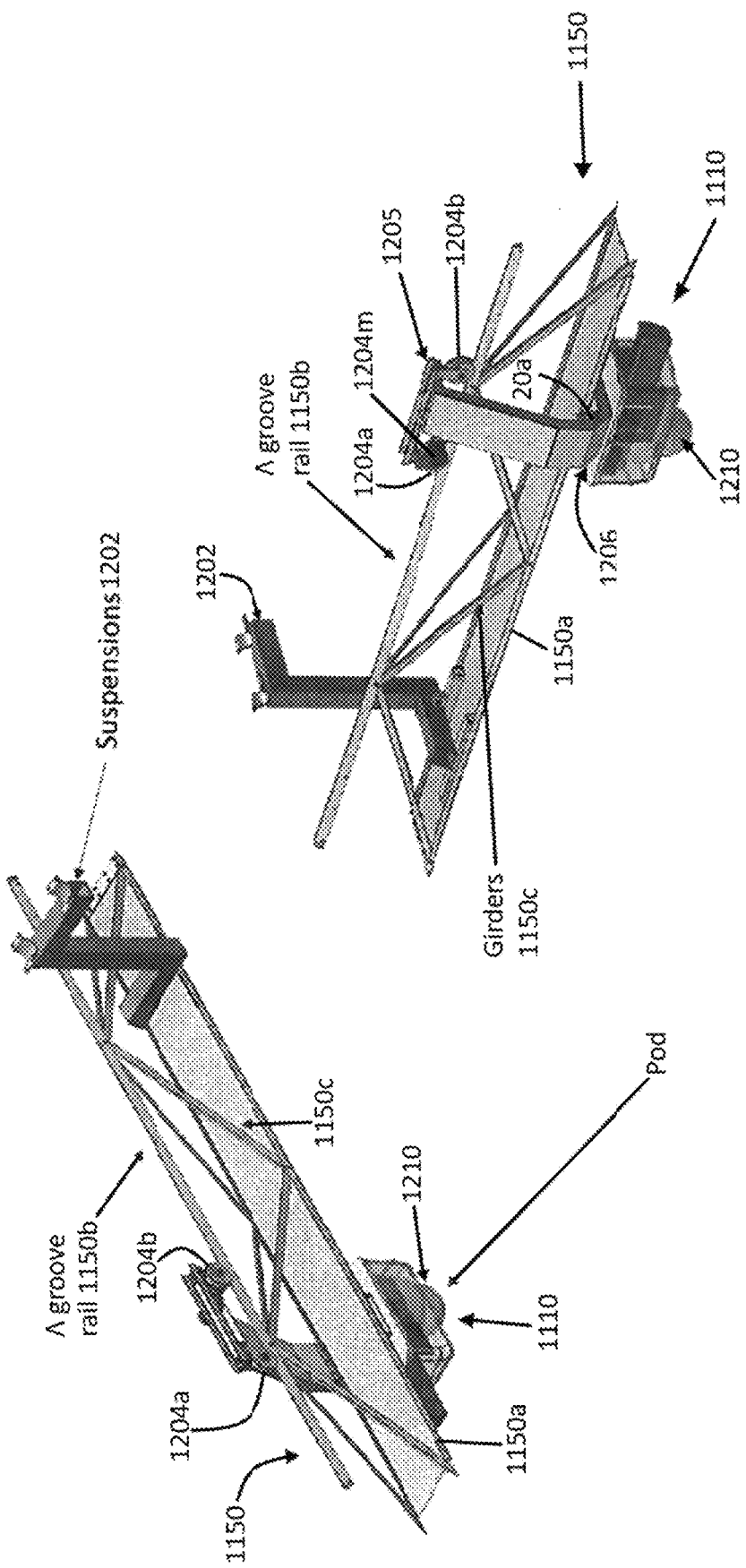

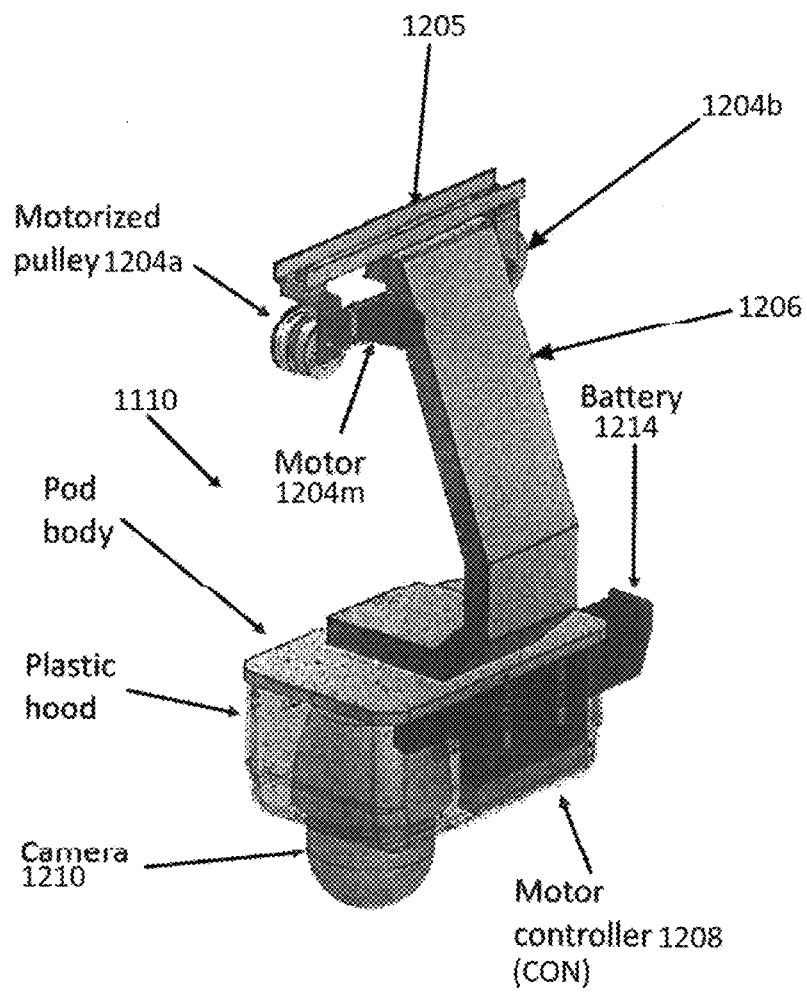
FIG3 2D-3

Process definitions:

Homing stations: A location on the rail with ID indication. Each home has a different I.D. Number.

Region Of Interest: R.O.I.

Reference Point Identification: R.P. identification

Reference Point Identification number: R.P. – I.D.

Preset: A point with definitions spatial coordinates positioning (for instance: - "X", "Y" and "Z" coordinates), defines PTZ, defined R.P. and defined R.O.I.

Time interval: The time delay between Preset #N to Preset #(N+1).

Procedure: A group of presets, each one with specified tasks, that are executed consecutively. The time between every two presets is "Time Interval".

Schedule: Defines the timetable to perform the procedures.

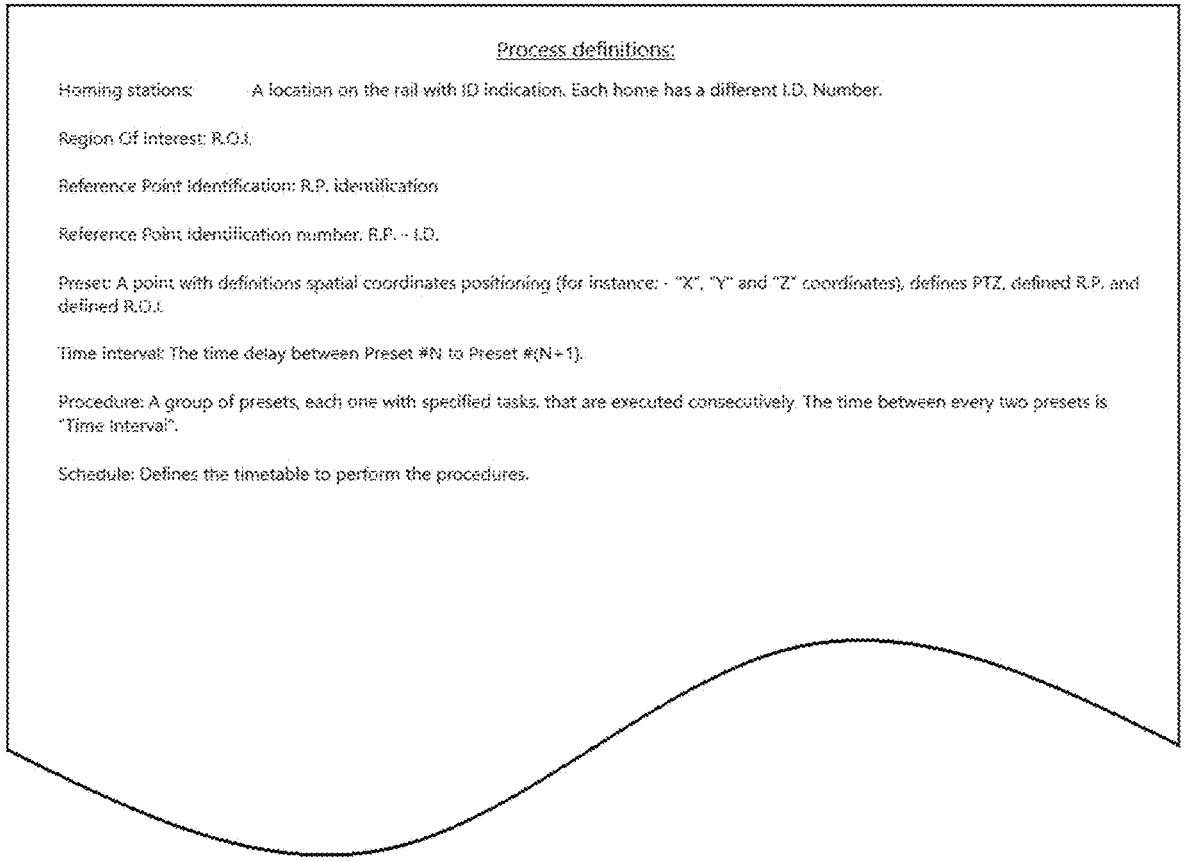

FIG. 2F-1

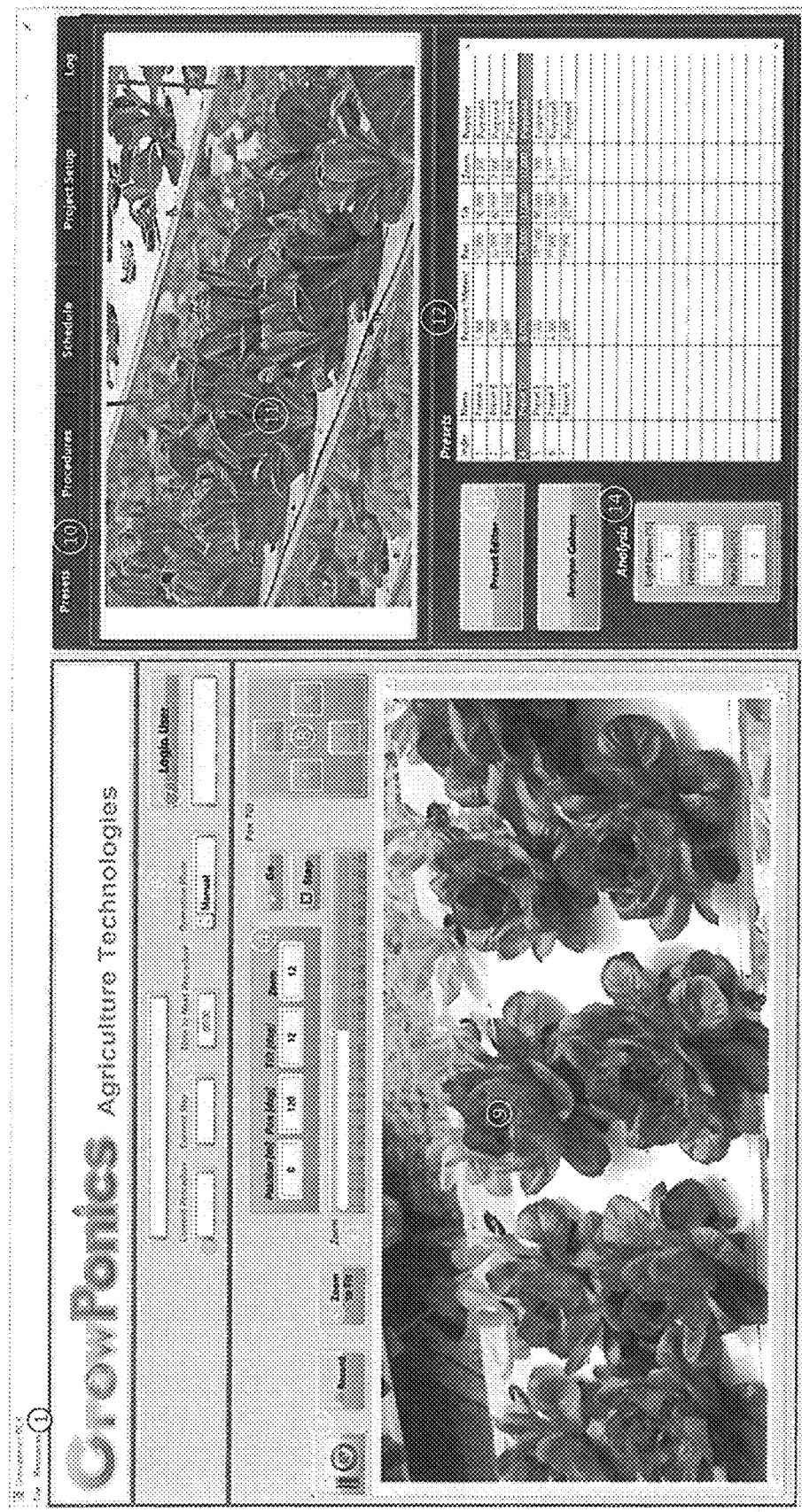

The left half of the GUI is dedicated to system status and manual camera control. The coordinates of the robot are composed of a linear position on the rail plus PTZ (pan tilt zoom) values, and are displayed in (4). The user can change these coordinates and press on Go to send there the robot, or press stop to halt its movement. The zoom can also be controlled by the zoom bar (3), and the pan / tilt can be controlled with the arrows (8). The current camera view is displayed in an image box (9). Snapshots or videos can be recorded (2). The image box (9) has a digital zoom capability that can be restored by pressing Zoom-to-Fit (3). The operation mode, manual or automatic can be selected (6), and the user can be changed from a User to an Administrator (7).

FIG. 2G-2

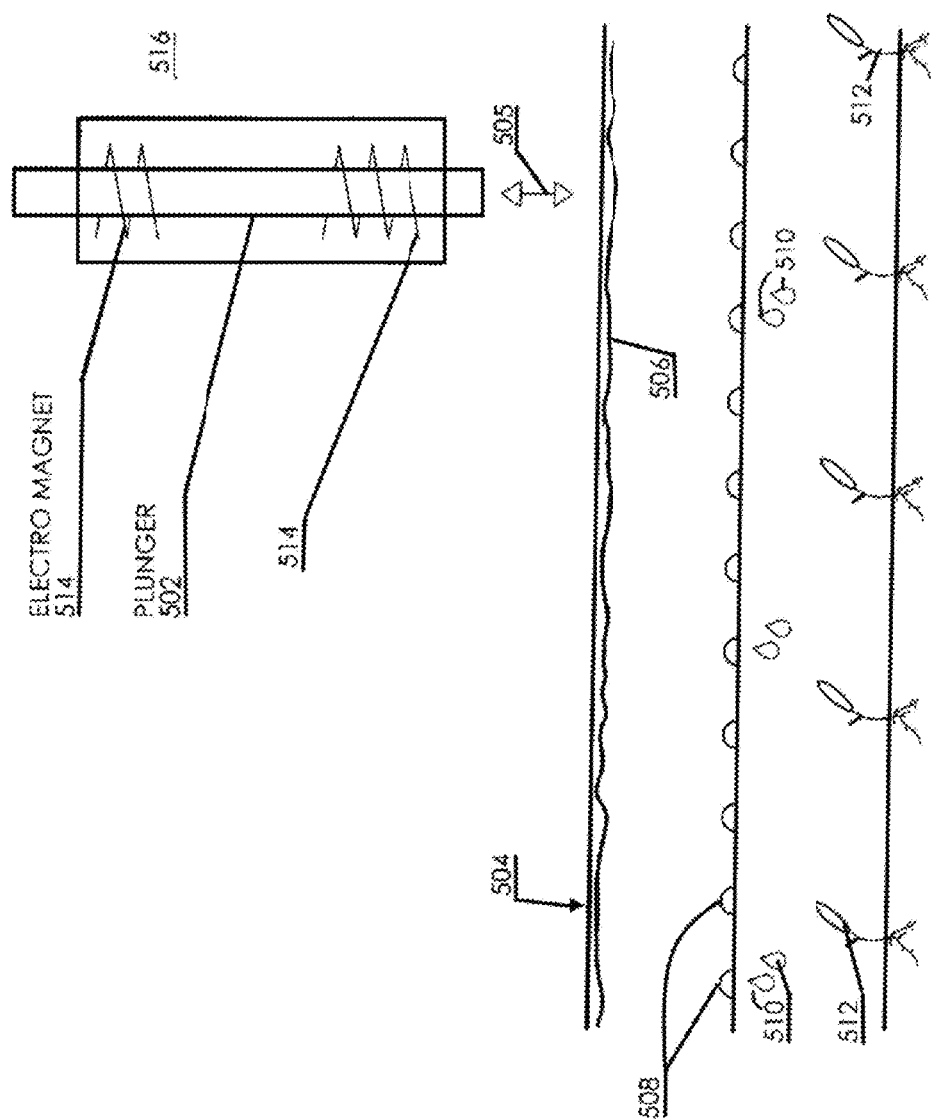

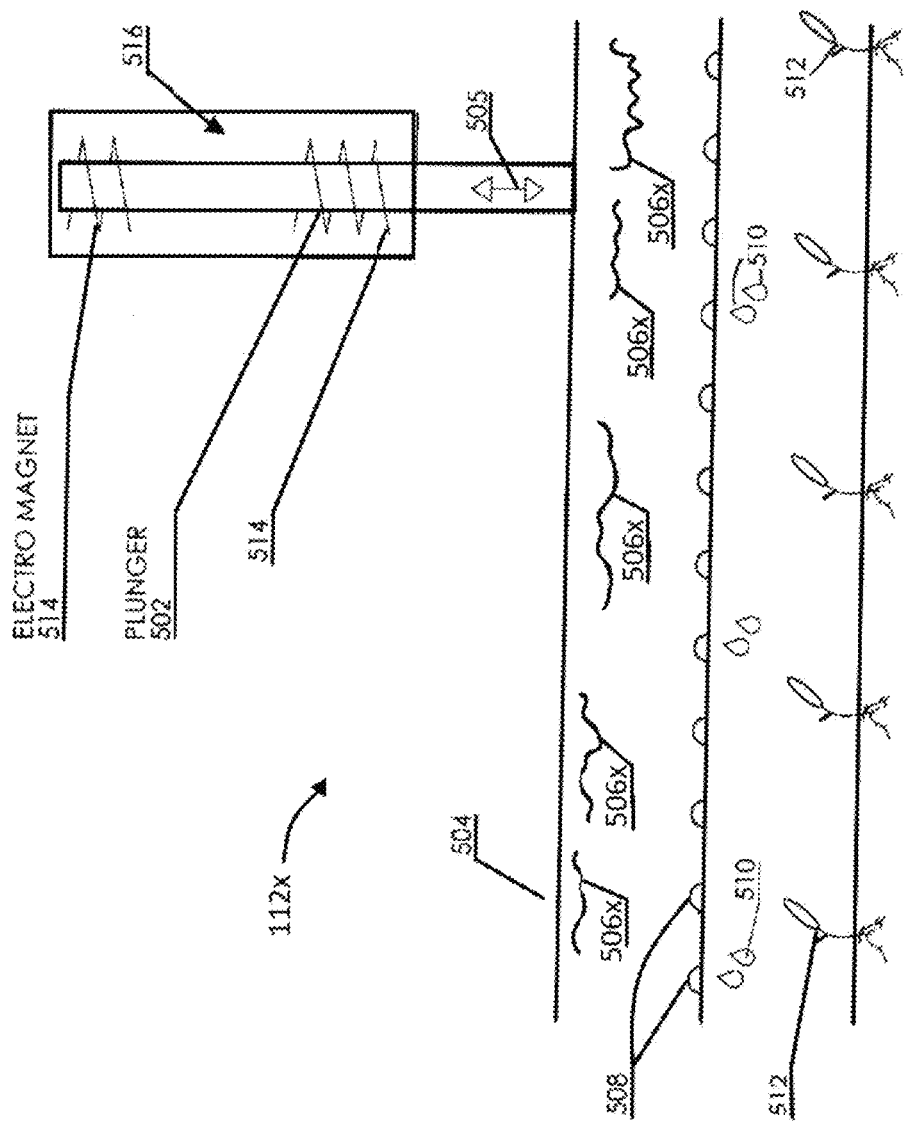

GREENHOUSE CONTROL SYSTEM

CROSS-REFERENCES TO RELATED APPLICATIONS

This application is a continuation patent application of commonly owned U.S. patent application Ser. No. 17/047,142, entitled: Greenhouse Control System, filed on Oct. 13, 2020, now U.S. Pat. No. 12,035,665, which a US National Phase Entry (§ 371 (c)) of commonly owned PCT/IB2019/053212, entitled: Greenhouse Control System, filed Apr. 16, 2019, which is related to and claims priority from commonly owned U.S. Provisional Patent Application Ser. No. 62/657,951, entitled: Greenhouse Control System, filed on Apr. 16, 2018, and Ser. No. 62/773,210, entitled: Agricultural Robot, filed on Nov. 30, 2018, all of the disclosures of which are incorporated by reference in their entirety herein.

TECHNICAL FIELD

The present invention is directed to computerized systems for controlling plant growth and development in greenhouses and other plant growth facilities.

BACKGROUND

Most, if not all, processes in a greenhouse are performed manually. This typically requires a human manager for each greenhouse, which is inefficient, and labor intensive, and accordingly, expensive.

SUMMARY OF THE INVENTION

The present invention is directed to systems and methods for controlling and managing plant development, from seeding through harvest, in greenhouses and other agricultural production facilities. The aforementioned systems and methods are computerized, and employ artificial intelligence (AI), which is used in making various decisions associated with the management of plant development.

Also disclosed are machines for use with the system or as stand-alones. These machines include those for growing and harvesting plants on a nutrient film, as well as machines for breaking up biofilm deposits, which if left unchecked can clog irrigation pipes, as well as cause other problems in the system.

The present invention is directed to inspection, monitoring and patrol robots, such as agricultural robots, which are used to monitor plant and crop conditions in agricultural systems, and the conditions of a greenhouse, building, ground, farm, or any other space needed to be inspected, controlled and monitored. The robots are designed to perform photographic and other sensing analysis, including data analysis, of crop and plant conditions in inspected and/or monitored sites, for example, by analyzing corresponding images of colors and their ratios associated with the crops, external condition such as the flow of water associated with the particular crop or plant section, and, disease and pest detection. The robot is designed to remember its position, location in space, as well as imaging device coordinates, at the location where the initial image was taken, including the imaging device pan, tilt, and zoom (PTZ) coordinates. Machine vision enables the robot to zoom in (zero in) precisely on a scenario that was photographed before, in order to compare data to data which was previously collected, and detect differences in the data, including photos and images, over time.

Embodiments of the invention are directed to a method for data collection. The method comprises: providing a robot for moving along a controlled path, the robot including at least one sensor; moving the robot to a first location for obtaining first data associated with the first location, and then to a second location; and, moving the robot back to the first location for obtaining second data, and confirming that the robot is at the first location by: analyzing presently sensed second data, and comparing the presently sensed second data against reference data for correspondence between the second data and the reference data.

Optionally, the method additionally comprises: obtaining the second data and analyzing the second data against reference data for correspondence between the second data and the reference data.

Optionally, the method is such that the reference data includes the first data.

Optionally, the method is such that the correspondence between the data is based on reference points.

Optionally, the method is such that the data includes one or more of: images, light, temperature, pressure, humidity, air, air quality, smoke, pollution, thermal, infrared (IR) light and energy, sound, ultraviolet (UV) light and energy, nutrients, and, motion detection.

Optionally, the method is such that the correspondence is between one or more reference points in the second data and the reference data.

Optionally, the method is such that the reference points include portions of second data and the reference data.

Optionally, the method is such that the at least one sensor includes one or more of: a camera, and detectors for at least one of light, temperature, pressure, humidity, air, air quality, smoke, pollution, thermal, infrared (IR) light and energy, sound, ultraviolet (UV) light and energy, nutrients, and, motion detection.

Optionally, the method is such that the controlled path includes at least one of a track or a rail.

Optionally, the method is such that the robot is moved by signals from a controller remote from the robot.

Optionally, the method is such that the first location is a preset, and the preset includes a position of the robot in space.

Optionally, the method is such that the at least one sensor includes a camera for capturing images, and the preset location includes at least pan, tilt and zoom (PTZ) position of the camera.

Embodiments of the invention are directed to a system for data collection. The system comprises: a robot for moving along a controlled path, the robot including at least one sensor; and, a processor. The processor is programmed for: moving the robot to a first location for obtaining first data associated with the first location, and then to a second location; and, moving the robot back to the first location for obtaining second data, and confirming that the robot is at the first location by: analyzing presently sensed second data, and comparing the presently sensed second data against reference data for correspondence between the second data and the reference data.

Optionally, the system is such that the at least one sensor includes one or more of: a camera, and detectors for at least one of light, temperature, pressure, humidity, air, air quality, smoke, pollution, thermal, infrared (IR) light and energy, sound, ultraviolet (UV) light and energy, nutrients, and, motion detection.

Optionally, the system is such that the controlled path includes at least one of a track or a rail.

Optionally, the system is such that the robot is moved by signals from a controller remote from the robot.

Optionally, the system is such that the first location is a preset, and the preset includes a position of the robot in space.

Optionally, the system is such that the at least one sensor includes a camera for capturing images, and the preset location includes at least pan, tilt and zoom (PTZ) position of the camera.

This document references terms that are used consistently or interchangeably herein. These terms, including variations thereof, are as follows.

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smart phone, personal digital assistant (PDA), mobile telephone or cellular telephone).

A "server" is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer.

An "application", includes executable software, and optionally, any graphical user interfaces (GUI), through which certain functionalities may be implemented.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 2B is a diagram of the robot system as part of the system of FIG. 1;

FIGS. 2D-1 to 2D-4 are perspective views of the robot of the robot system of FIG. 2C, on a rail (FIGS. 2D-1 and 2D-2) and without the rail (FIGS. 2D-3 and 2D-4);

FIG. 2F-1 is a diagram of definitions used in the flow diagram of FIG. 2F-2;

FIG. 2F-2 is a flow diagram detailing an example process performed by the robot of FIGS. 2C, and 2D-1 to 2D-4;

FIG. 2F-3 is a diagram of position correction from the flow diagram of FIG. 2F-2;

FIG. 2F-4 is a flow diagram of another process performed by the robot of FIGS. 2C, and 2D-1 to 2D-4;

FIGS. 2G-1 and 2G-2 detail example processes performed by the robot of FIGS. 2C and 2D-1 to 2D-4;

FIG. 3 is a block diagram of an Artificial Intelligence (AI) engine as part of the system of FIG. 1;

FIG. 4B-1 is a diagram of a Nutrient Film Technique (NFT) system in accordance with embodiments of the invention;

FIG. 4B-2 is a top view of the a portion of the NFT system of FIG. 4A;

FIGS. 5A and 5B are diagrams of a hammer system in accordance with embodiments of the present invention; and, FIG. 6 is a flow diagram for a process performed by the hammer system of FIGS. 5A and 5B.

Figure 1:
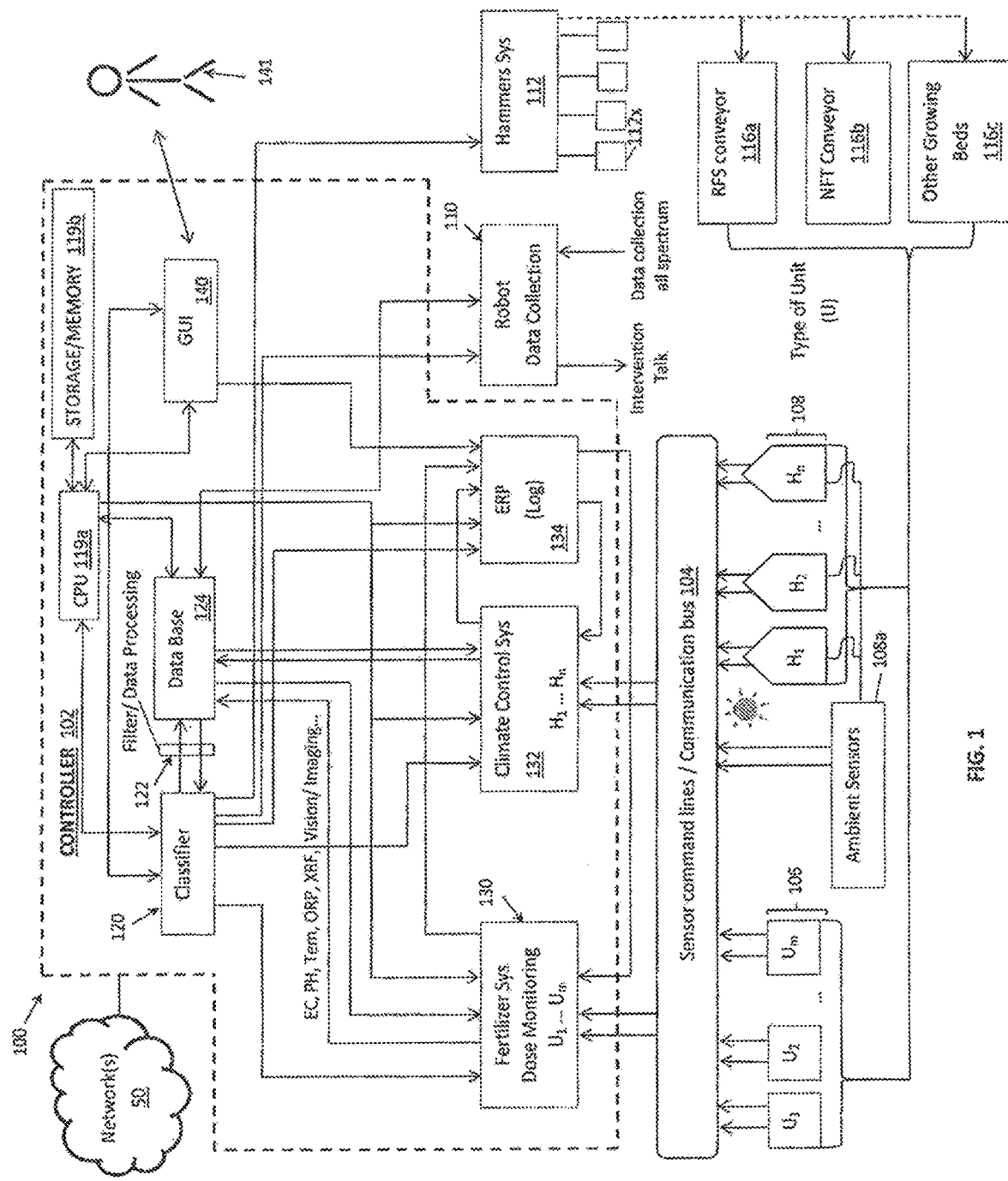
FIG. 1 is a diagram of an exemplary environment for the system of the present invention.

This document includes Appendices: Appendix A (Four Pages), Appendix B (Nine Pages), Appendix C (Six Pages), and Appendix D (Thirty-four Pages), which are attached.

DETAILED DESCRIPTION OF THE DRAWINGS

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

Throughout this document, references are made to directions, such as upper, lower, proximal, distal, upward, downward, top, bottom and derivatives thereof. These directional references are for example, only, in order to describe the various systems, machines and apparatus in an example operation, and are not otherwise limiting.

The present invention is directed to computerized, and automated, control of systems associated with greenhouses, farms and the like, but is not limited thereto. The systems and methods disclosed herein are used in controlling and managing performance of greenhouses, farms and the like, from seeding through harvest. The invention also provides a system which includes a data collection robot, which collects large amounts of data, and stores it, for example, using structured query language (SQL). The data collected and stored includes, for example, images in the visual spectrum, infrared (IR) or ultraviolet (UV) spectrums, sounds of any kind including ultrasounds or any other data that can be detected. The data analysis uses, for example, artificial intelligence (AI) learning and comparison procedures, in order to draw conclusions as to the control of the site or system, to improve and/or maximize performance.

FIG. 1 shows an exemplary system 100, an agricultural system, which, for example, employs hydroponics, in accordance with the invention. The system includes a controller 102 which is linked to a communication bus 104 (representative of multiple communication busses), which is in turn, linked to sensors for units 106 of plants ($U_1$ to $U_m$, with "m" being the last of the units), and greenhouses 108 ($H_1$ to $H_n$, with "n" being the last of the greenhouses). The controller 102 also links to a robot 110 for data collection and a hammer system 112. The controller 102 also links to a network(s) 50.

The network(s) 50 is, for example, a communications network, such as a Local Area Network (LAN), or a Wide Area Network (WAN), including public networks such as the Internet. The network(s) 50 may also be a combination of networks and/or multiple networks including, for example, cellular networks. The network(s) 50, although shown as a single network, may be a combination of networks and/or multiple networks including, for example, in addition to the Internet, one or more cellular networks, wide area networks (WAN), and the like. "Linked" as used herein includes both wired and/or wireless links, connections, and the like, either direct or indirect, and placing the computers, including, servers, components and the like, in electronic and/or data communications with each other.

Figure 4A:
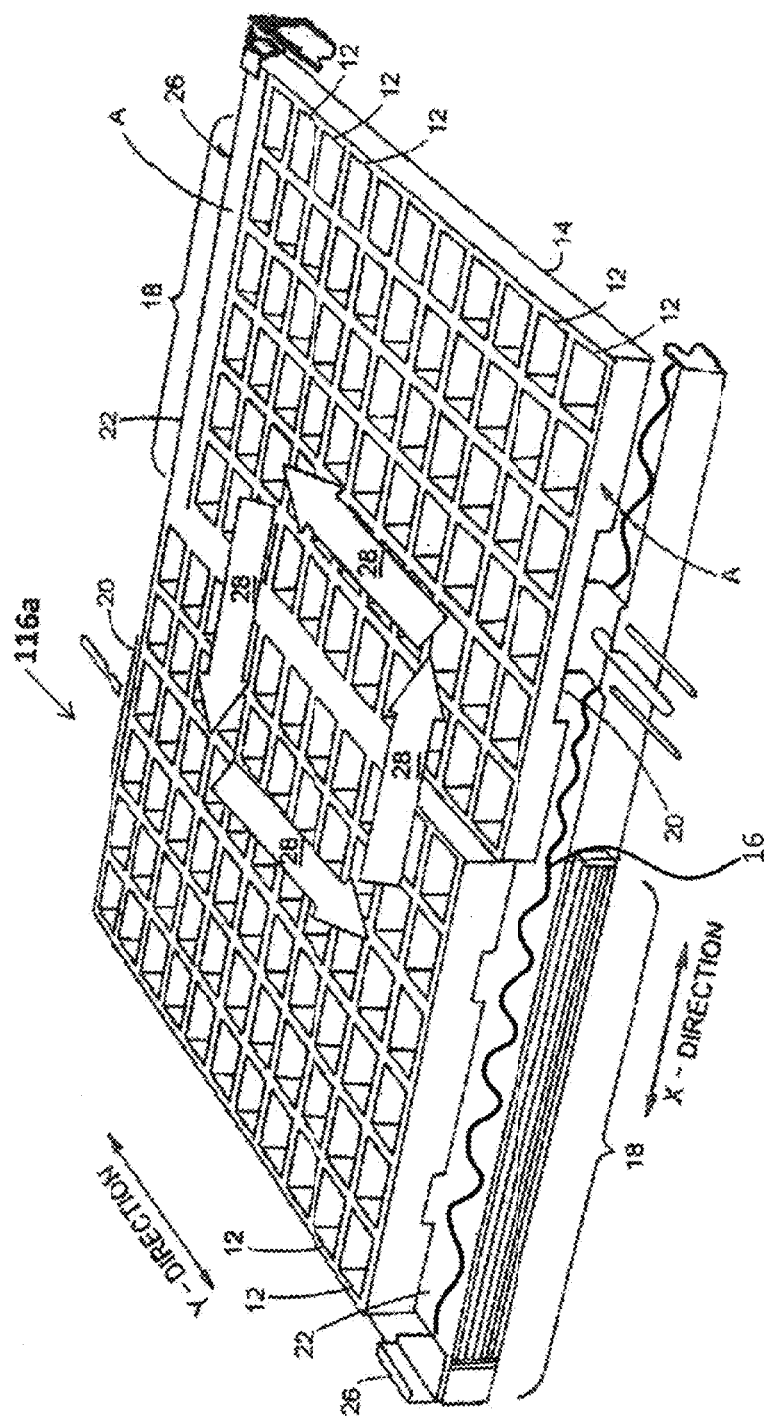
FIG. 4A is a diagram of a Rotating Field System (RFS) in accordance with embodiments of the invention.

The units (U) 106 include Rotating Field System (RFS) conveyers, such the example RFS 116a shown in FIG. 4A and, for example, as shown and described in commonly owned U.S. Pat. No. 9,848,544, entitled: Automated Hydroponic Greenhouse Factory, the disclosure of which is incorporated by reference in its entirety herein. Other units (U) 106 include Nutrient Film Technique (NFT) Conveyers 116b, and other growing beds 116c (including growing beds using conventional and hydroponic techniques). Each of the units 116a, 116b, 116c may include a hammer system 112, of individual hammer system units 112x.

The sensor command lines/communication bus 104 supports sensors, such as those for: electrical conductivity (EC), pH, temperature, oxidation-reduction potential (ORP), x-ray spectroscopy (using an x-ray spectrometer for performing elemental analysis by Energy Dispersive X-ray Fluorescence (EDXRF) or Wavelength Dispersive X-ray Fluorescence (WDXRF)), and vision/imaging (cameras, imaging, and image processing apparatus). The command lines 104 include electrical lines, and typically, also include fiber optic lines and convertors, repeaters, wireless communication transmitters, filters and Remote input/output (I/O) (RIO) integrated boards with a Central Processing Unit (CPU) and memory. The RIOs are also designed to perform local control tasks without having to send the information to the controller 102 and wait for a response. This allows for fast response time, in situations such as switching a conveyer ON and waiting for it to start (respond) within milliseconds.

The controller 102 includes various processors, such as a central processing unit (CPU) 119a, including microprocessors, and other computer components. The CPU 119a is in electronic and/or data communication with storage/memory 119b. The controller 102 also includes a classifier 120, a filter 122, and database(s) 124. These components 120, 122 and 124 are linked to and interact with a fertilizer module 130, a climate control module 132 and an Enterprise Resource Planning (ERP) module 134. The term "module" includes a component for storing instructions (e.g., machine readable instructions) for performing a process, and including or associated with processors for executing the instructions.

The controller 102 includes a graphical user interface (GUI) 140, through which a user 141 can interact with the controller 102 and control the system 100, both locally, and remotely, over the network(s) 50.

The CPU 119a links to the components 120, 122, 130, 132, 134, 140 of the controller 102. The CPU 119a and storage/memory 119b, are linked, and are linked to the components 120, 122, 130, 132, 134, 140, such that all of the aforementioned components are linked to each other, either directly or indirectly. These components operate in conjunction with the CPU 119a and storage/memory 119b to perform the processes (methods) of the present invention.

For example, the processors of the CPU 119a may include x86 Processors from AMD (Advanced Micro Devices) and Intel, Xenon® and Pentium® processors from Intel, as well as any combinations thereof. Additional processors, including hardware processors, storage/memory, modules and storage media may also be part of the system for performing the invention.

The storage/memory 119b stores machine-executable instructions executed by the CPU 119a for performing the processes of the invention, as detailed below. The storage/memory 119b, for example, also provides temporary storage for the controller 102.

The fertilizer module 130 monitors and controls fertilizer dosing, based on sensed parameters in the units 106, including, for example, electrical conductivity, pH, temperature, Oxidative Reduction Potential, x-ray spectroscopy (XRS or XRF), and vision/imaging. EC (Electrical Conductivity) represents the total amount of dissolved solids (TDS) in the water (e.g., nutrient solution), the solids corresponding to the fertilizer. EC measurements provide a good evaluation of TDS. By providing a small and fixed amount (DOSE) of fertilizing solution followed by time for this amount to mix with the water in the unit (U), the system allows reaching a set point accurately without over-dosing.

The dose is determined by the volume of water in the unit (U) and the biomass cultivated. The fertilizing solution is comprised of at least one fertilizing mixture. The pH is such that the desired level is defined by two set points, above and below an average or normal pH. pH is monitored and corrected either by addition of acid or by an addition of base. The same "dose" sequence is applied adding only a dose of acid or base at a time and allowing it to mix in before measuring again. The ORP of the solution allows better control of microbial growth. This is measured with an electrode and monitored by injection of solution. The same "dose" sequence is applied adding only a dose of the solution at a time and allowing it to mix in before measuring again. Flow diagrams for fertilization processes performed by the fertilizer module are provided as Appendix A, attached hereto.

The climate module 132 functions to control the climate, typically in terms of one or more of temperature, humidity and light, in each greenhouse H 108. Cooling the greenhouse H 108, for example, is done by passive ventilation (opening windows) and active ventilation (fans). The process provided in Appendix B, attached hereto, applies data, sensed from ambient temperature sensors 108*a*, wind speed and wind direction, and controls the operation of fans and the opening of windows of the particular greenhouse H (which windows to open so as to create airflow in a given direction).

The ERP module 134 provides logs of the number of plants, or batches of plants, in each section of the greenhouse (sections may be of different size), its variety, when each plant was planted (seeded), all transplants of the plant, fertilizer amounts used for each plant, plant location greenhouse/unit, plant status (stage of production) and projected harvest time. This data for each plant, or batch of plants, is used, for example, to create recommendations on when to order more seeds and how much stock will be available for sale at any given day. As the number of plants and, thus, the data increases, the classifier 120 may be trained with this data to forecast plant growth, from seeding to harvest.

Figure 2A:
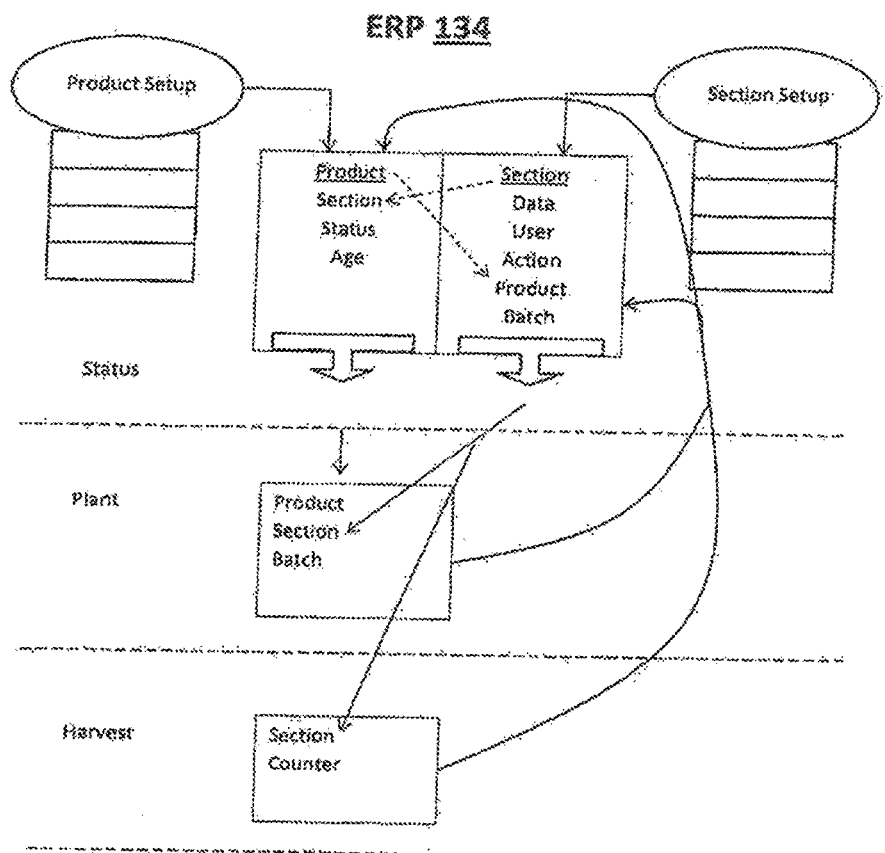
FIG. 2A is a diagram of an Enterprise Resource Planning (ERP) module of FIG. 1.

FIG. 2A shows the ERP module 134, which can be synchronized with any external accounting system and generate purchase orders for raw materials, such as seeds, fertilizer, and the like, and create production forecasts.

All data from the Fertilizer module 130, the climate control module 132 and ERP module 134 is sent to the database(s) 124. Data is also sent to the database(s) 124 from the robot 110 and the hammer system 112, with individual hammer units 112*x*. This data from the databases 124 is filtered by the filter 122. The filtered data is received by the classifier 120, for example, in response to a request from the classifier 120 based on the objective function the classifier 120 is to perform.

The classifier 120 analyzes the given received data, as input, in accordance with one or more objective functions. Objective functions for the classifier 120, for example, include: maximum profits; maximum revenues; maximum plant yield (weight based); maximum nutritional value of the plants; minimal water usage; and, minimal fertilizer usage.

As shown in FIG. 2B, the robot 111 of the robot system 110 is, for example, shown as a block diagram. The robot 111 is, for example, a rail/line riding or autonomous robot, equipped with devices, such as cameras 150, video displays, microphones, sonic detectors, and speakers, to enable viewing the plants and workers in real time, and to assist in detection of problems that cannot be detected solely through the system 100. The robot 111 provides interaction between with the greenhouse workers and the controller 102, via the robot input/output (RIO) module 152. The motion of the robot 111 is controlled by a motion controller 154, which can be either controlled by an expert in the control center, via the GUI 140, or remotely, over the network(s) 50, via WiFi® transceivers 156, 157 on the robot 111 and controller 102, respectively. The robot 111 is powered by a power source 158, such as a battery.

The robot 111 functions by gathering data on the normal patterns of the farm (via thermal or sonic imaging) and will be able to detect abnormalities. For example, a burst in a pipe may be viewed as a cold spot in thermal imaging. An inner clog in a pipe will lead to plant dehydration, which may be detected by a rise in temperature of the plants in the affected area. Insect infestation can be detected by sonic detectors. The robot 111 is also programmed to sound an alarm, or signal a communication to an operator, via the GUI 140 or over the network(s) 50 that attention is needed.

Reference is now made to FIGS. 2C to 2G-2, which shows another robot system 110', suitable for use as the robot system 110 of FIG. 1.

Figure 2C:
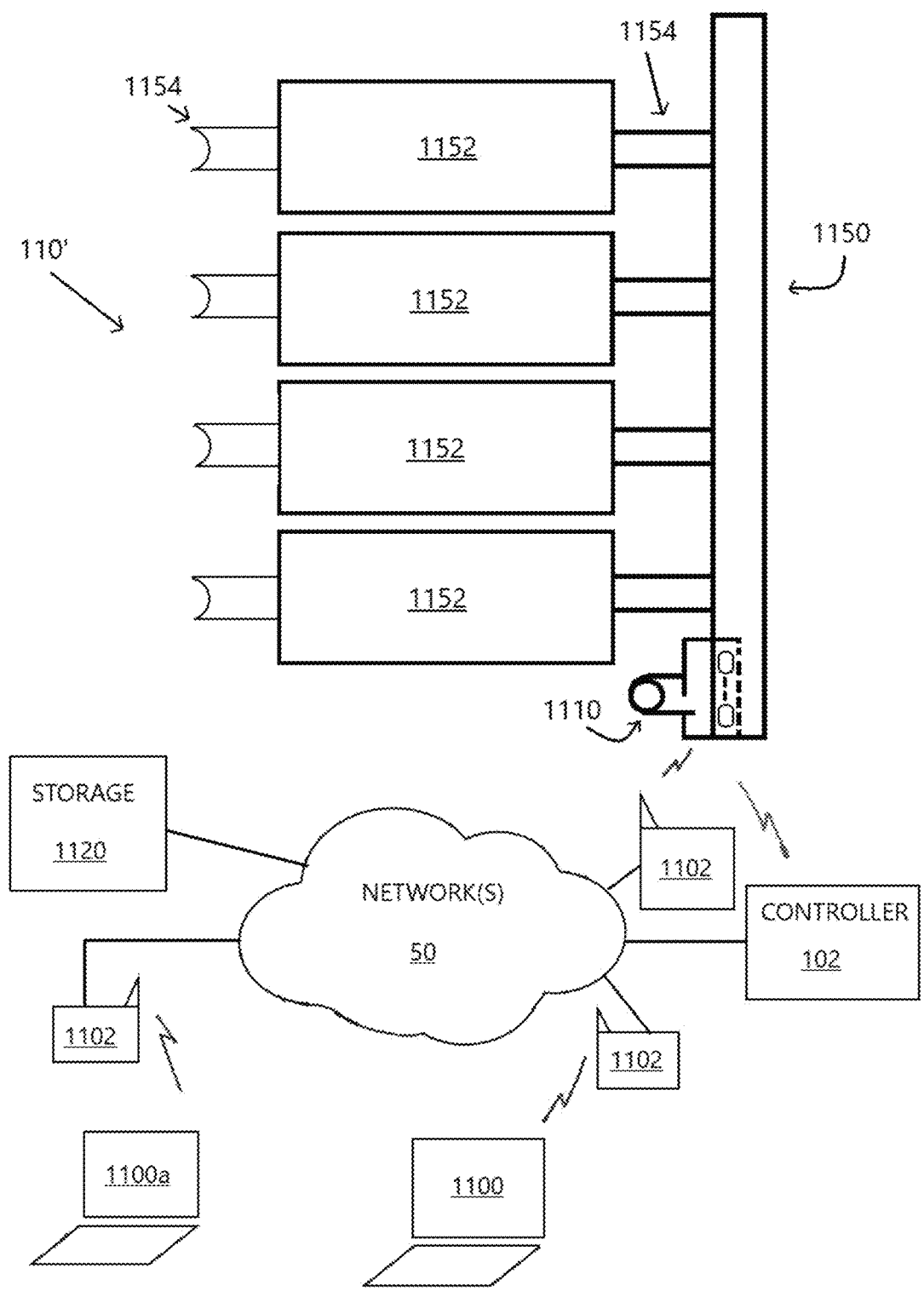
FIG. 2C is a diagram of an another robot system as part of the system of FIG. 1.

FIG. 2C shows an exemplary operating environment, includes the network(s) 50, to which is linked the controller 102 or a host computer 1100 and/or a host server (e.g., which directly links to the network 50), and a robot 1110. The robot 1110, for example, also links to a WiFi® device 1102, to link to the network 50 (to be under the control of the controller 102, via WiFi®, radio signals, infrared signals, or the like, or a host computer 1100). While the controller 102 and its operation of the robot system 110' is detailed below, the description provided for the controller 102 is also applicable to the host computer(s) 1100.

The controller 102 supports the robot system 110', either alone or with other, computers, including servers, components, and applications, for controlling the robot 1110 and performing various processes in accordance with the invention. There is also storage 1120, for example "cloud storage", linked to the network(s) 50, and associated with the controller 102. The controller 102 may, for example, also include an auxiliary host computer/host server 1100*a*, from which the robot 1110 and the system 110' can be controlled. The robot 1110 functions, for example, as a data collection robot.

Remaining in FIG. 2C, the robot 1110 moves along a rail 1150, which is, for example, a controlled path for the robot 1110. The rail 1150 may also be single or multiple tracks and/or guides. The rail 1150 is positioned proximate to growth areas 1152 for plants, crops and the like, as well as irrigation channels 1154, which supply water and nutrients to/from the respective growth areas 1152.

Figures 2, 2D, 3, 4:
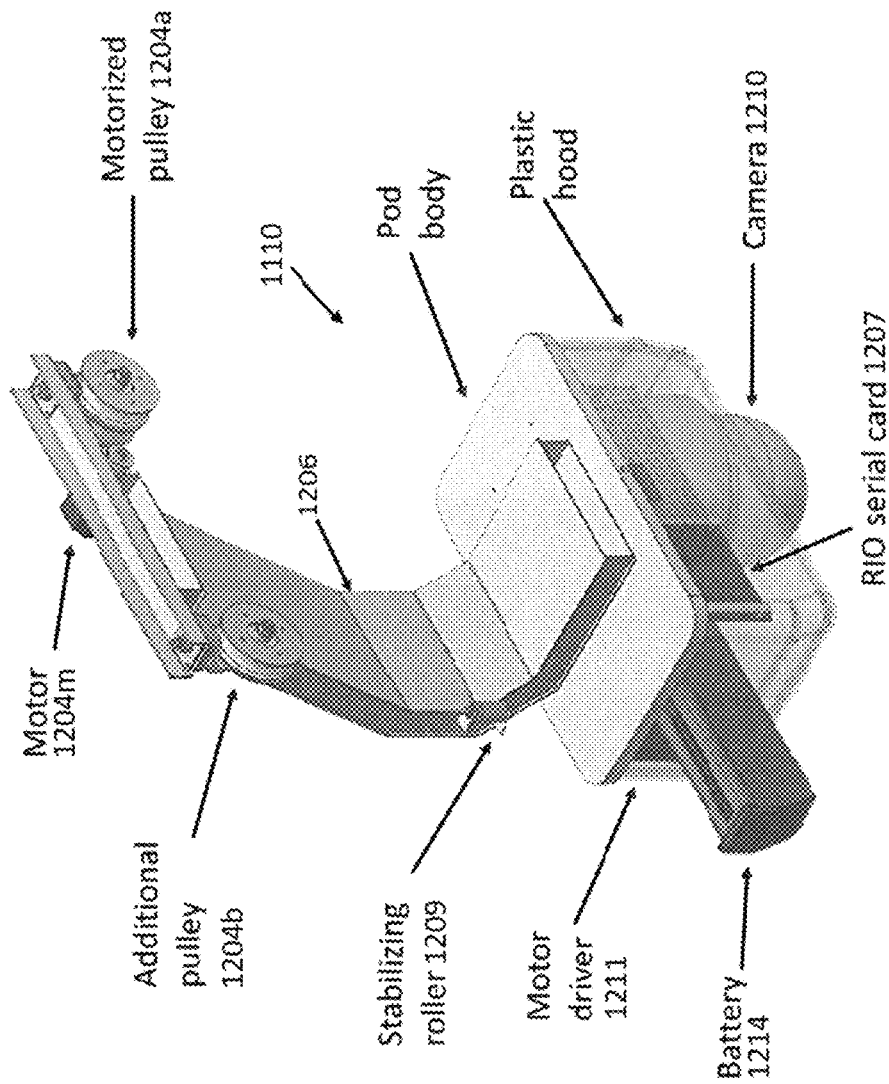

FIGS. 2D-1 to 2D-4 show the robot 1110, with FIGS. 2D-1 and 2D-2 showing the robot 1110 as it is movably mounted along the rail 1150. The rail 1150 is in turn, mounted to a wall ceiling or the like, by suspension 1202. The rail 1150 includes a base 1150*a*, and a track 1150*b*, supported by supports 1150*c* extending from the base. The rail 1150*b* supports wheels 1204*a*, 1204*b* of the robot 1110. The wheels 1204*a*, 1204*b* attach to a crossbar 1205 via an arm 1206, which connects to the robot 1110. At least one wheel 1204*a* is powered by a motor 1204M, under control of a motor driver 1211. The motor driver 1211 is controlled by a reconfigurable input output RIO microprocessor (RIO) 1207 that receives orders from the robot controller (CON) 1208 which, for example, serves as a main computer for the robot 1110. The RIO 1207 is, for example, a printed circuit board that has a programmable microprocessor plus input and output ports, either digital or analog. For example, the RIO 1207 is connected by means of serial communication (Universal Serial Bus (USB) and the like) to the robot controller 1208, to transmit and obtain these inputs and outputs from dedicated software. Support rollers 1209 on the arm 1206, which are, for example, spring biased, contact the rail base 1150*a* for easing the robot's 1110 movement along the rail 1150. The RIO 1207 is controlled, for example, by the robot controller 1208.

The robot controller (CON) 1208 also controls the imaging device, e.g., camera 1210, of the robot 1110, including the images, taken and time stamps therefore, image processing, as well as camera location, including track location as well as positioning of the PTZ and the PTZ coordinates for the camera lens associated with track location, defining each "preset". The controller 1208 also includes a processor, for processing signals received from the network(s) 50 (and received in a transceiver on the robot 1110), as well and sending signals, images and the like, via the transceiver on the robot 1110 to the controller 102 (or host computer 1100). The camera 1210, motor 1204M and controller are receiving power from a power supply, such as a battery 1214.

While a camera 1210 is shown, the robot 1110 may also include, in addition to or instead of the camera 1210, one or more of multispectral cameras (which, for example, operate as image sensors), sensors (e.g., light, temperature, pressure, humidity, air, air quality, smoke, pollution, thermal, infrared (IR) light and energy, sound, ultraviolet (UV) light and energy, nutrients, motion detection, sound), microphones and other audio equipment, and, pesticide dispersion units, such as sprayers.

The robot 1110 is designed for collecting large amounts of data, for example, images, thermal readings, such as temperature, pressure, and light conditions, and sounds, and store this data in a database 124 using, for example, Structured Query Language, SQL. The robot 1110 is programmed to return to the same location along the rail 1150 and collect data, including taking images from this exact same location (position in space, for example, expressed by coordinates), the exact same location known as a "preset". This "preset" is the exact same location on the rail 1150, the same PTZ and the same region of interest (ROI), allowing to focus on specific portions of the image, which are of interest. For example, by focusing on a certain portion of each image from the preset, taken at different times, plant growth, fast, normal or slow, can be detected, as can be color, such as a lack of green or various shades of green being indicative of plant health, or color, indicative of plant health, soil conditions, nutrient conditions and absorption into the plant, insect and pest infestations, and the like.

The robot 1110 is such that it can repeat the same picture at every desired time period, such as every hour, day or every week, or at intervals, both regular and random. This allows for analysis by comparing images, for learning, e.g., artificial intelligence, and making decisions, e.g., increasing/decreasing sunlight exposure. The robot 1110 is programmed to "get back" or return to the same place. This is performed by computer analysis of "reference points" (for example, from previous images which serve as reference images, or known points, such as structures, landmarks and the like) in order to "fine tune" and adjust the "preset." The computer analysis, for example, employs comparisons and/or looking for correspondence between data (data sets), including reference points in the data being compared and analyzed. The processes for operating the robot 1110 include algorithms, and are such that the robot 1110 can return to each desired "preset" and collect data including images from each desired "preset" for data collection. The procedure of returning to a desired preset is performed before images are taken and stored. As a result, at a later time and/or with another computer, the images and data are analyzed, for example, by comparisons and/or looking for correspondence between data (data sets), including reference points therein, allowing for decisions to for better greenhouse factory operation.

Figure 2E:
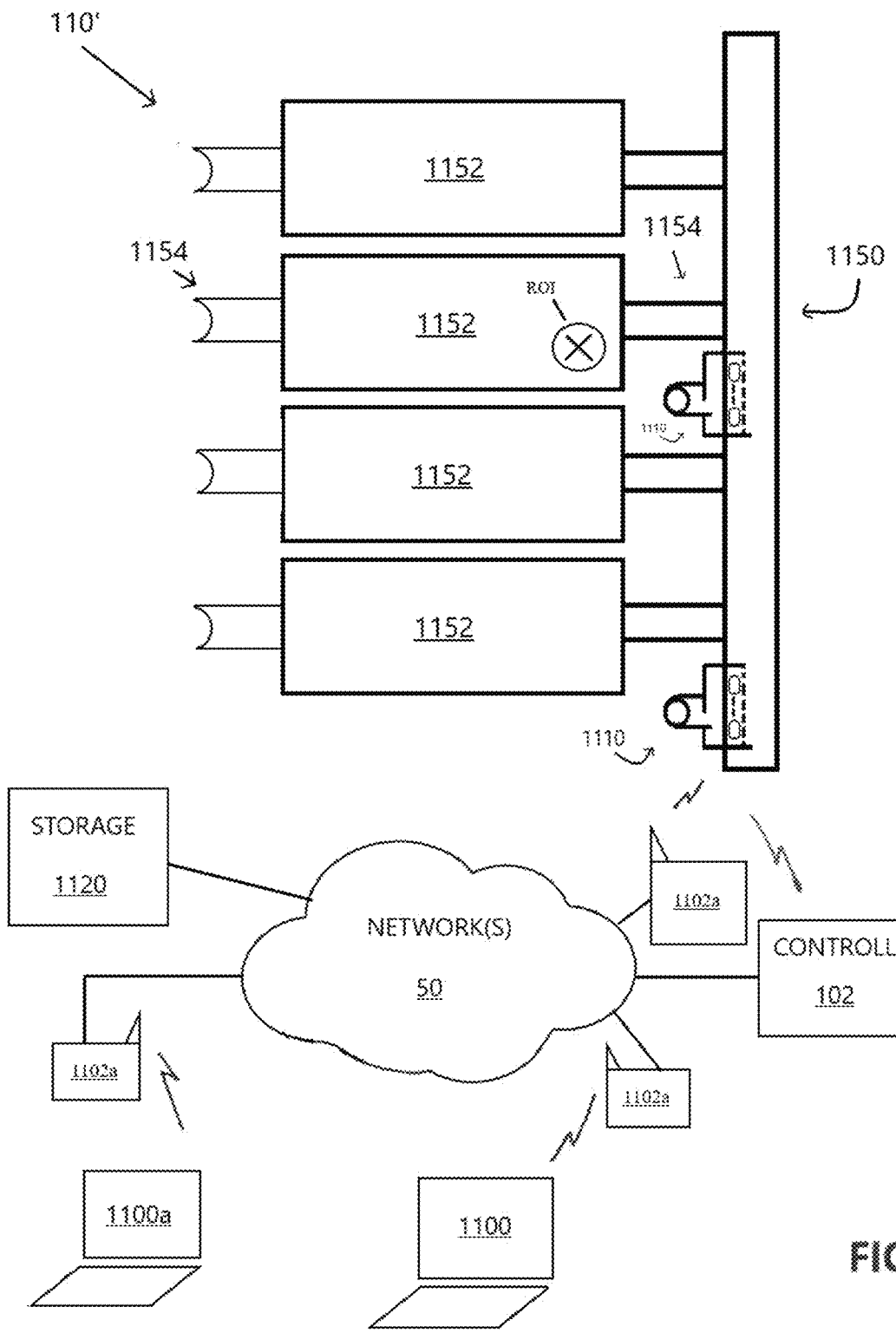
FIG. 2E is a diagram of the robot of FIG. 2C having moved along the rail to a new location or PRESET from that of FIG. 2C.

FIG. 2E shows the robot 1110 having moved to a location along the rail 1150 in FIG. 2C to the location on the rail 1150, known as a "preset", where a region of interest (ROI), represented by the location X, in the growth area 1152. This preset is a location in space, defined by parameters, including the location of the robot 1110 along the rail 1150, the Pan, Tilt, Zoom (PTZ) of the robot camera 1210 to focus on the ROI, the ROI location, and reference points at the ROI, as defined in the process definitions of FIG. 2F-1.

The robot 1110 is such that it must return to the exact preset, for example, on multiple occasions, at regular or random intervals, such as every hour, every day, or other preset time, in order to obtain an image of a ROI, as well as sample environmental parameters, such as temperature, air quality and the like. By returning to the exact preset, the robot 1110 can perform repeated operations, necessary for data collection and analysis, as detailed below.

Figures 2, 2F:
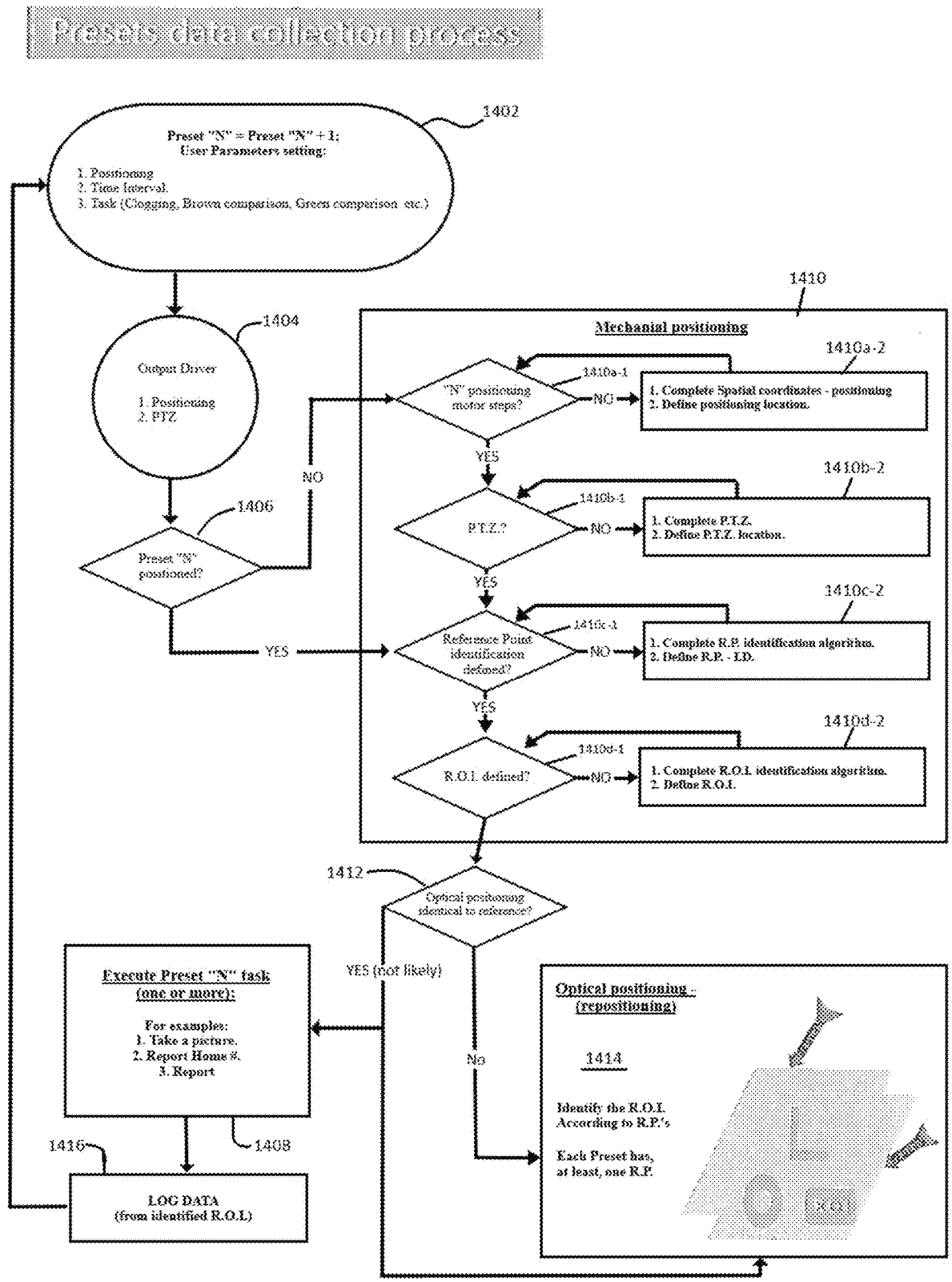
Figures 2, 2F, 3:
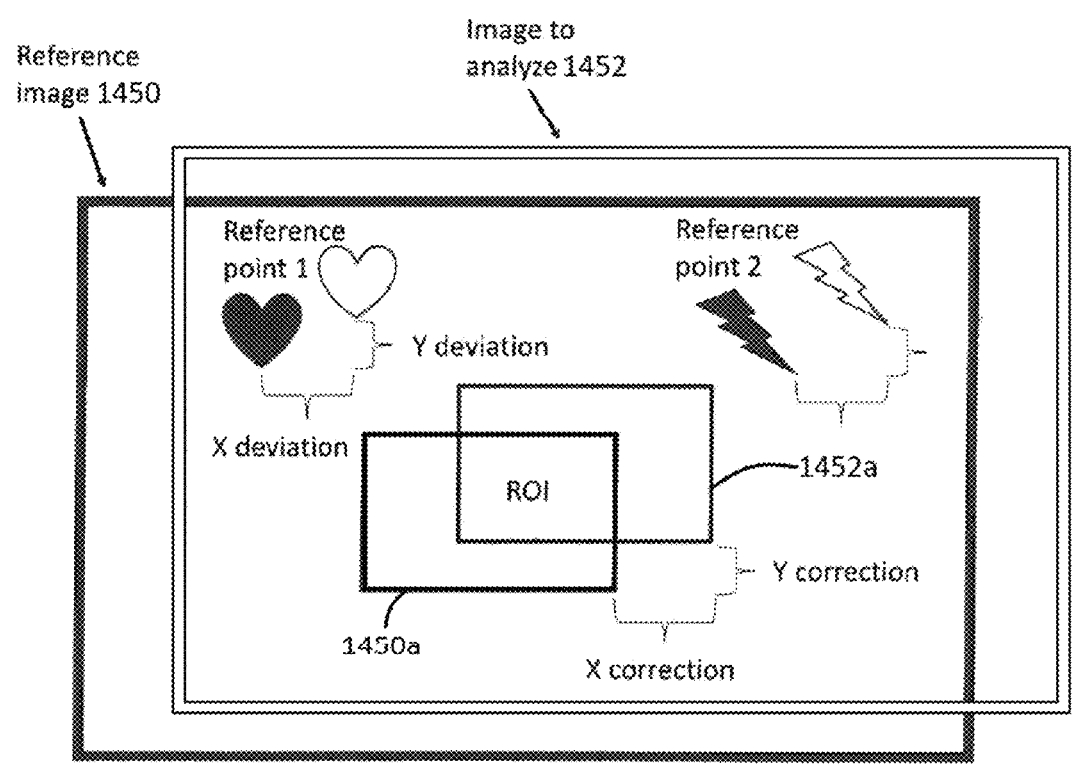
Figures 2, 2F, 3, 4:
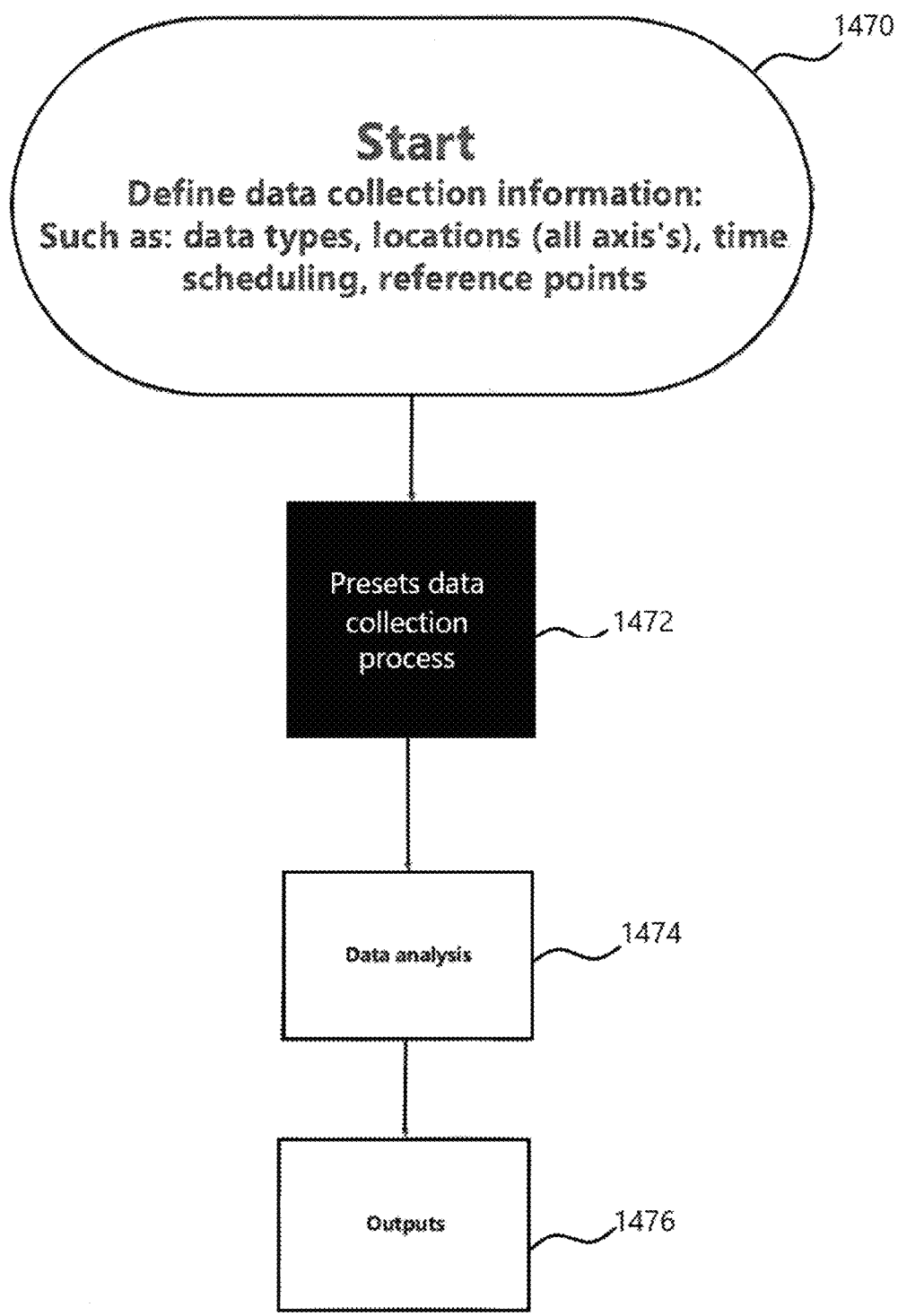

The robot 1110 returning to the exact preset involves a process formed by two subprocesses, and is shown in the flow diagram of FIG. 2F-2. The first subprocess is a mechanical positioning process, and the second subprocess is an optical positioning/repositioning process based on software, to correct the position of the robot and/or the camera and its PTZ orientation (coordinates). This second subprocess includes a frame grabbing procedure to fine-tune the data capture position and angle of capture, by identifying data parts that are known to be in a specific location, e.g., from reference images or established structures, landmarks, and the like, in order to repeatedly determine robot 1110 and camera 1210 (and sensor) positions and camera 1210 (and sensor) angles. increase the position and angle These subprocesses are, for example, performed automatically and in real time.

The process, as per the flow diagram of FIG. 2F-2 includes the following terms (also listed in FIG. 2F-1):

HOME—a location on the rail 150 with an ID (Identifier) location. Each HOME has a unique ID location;

PRESET—a point with definitions of:
  Spatial coordinates in space, e.g. location on the rail
  PTZ values.
  At least one reference points, defined for example by a rectangle in the frame.
  ROI, defined for example by a rectangle in the frame TIME INTERVAL—The time delay between PRESET #N to
PRESET # (N+1)

PROCEDURE-A group of presets, each one with specified tasks, which are executed successively. The time between two consecutive presets is the "Time interval".

SCHEDULE—Defines the timetable to perform the procedures.

REFERENCE POINT IDENTIFICATION—An image analysis subprocess that compares an obtained image to a reference image and finds the pattern of the reference point.

REFERENCE POINT IDENTIFICATION NUMBER—RPID

REFERENCE POINT IDENTIFICATION ALGORITHM—a subprocess for finding reference points in case of a major deviation in mechanical positioning. This process may include for example: returning to the nearest homing station and returning to the preset, scanning the immediate area for the reference points or another method.

ROI IDENTIFICATION ALGORITHM—a sub process for finding the ROI after the reference points have been identified, in case of a minor deviation in mechanical positioning. This process may include for example, a mechanical movement correction that will include the ROI in the frame.

Returning to FIG. 2F-2, the process shown is an example process for data collection. Initially, at block 1402, parameters are set, and include, for example, positioning, a time interval, and a task such as color analysis, clogging analysis, growth comparison and analysis, and the like. At block 1404, an outputs driver is set and includes robot positioning and PTZ orientations and settings.

The process moves to block 1406, where the robot 1110 position is determined. If the robot 1110 is at the PRESET location, the process moves to block 1410c-1, for reference points identification.

Returning to block 1406, should the robot not be at the preset position, the process moves to block 1410, where the mechanical positioning subprocess is performed. Initially, the motor 1204M moves the robot 1110 to the PRESET location, at block 1410a-1. If the robot 1110 has not reached this location, the process moves to block 1410a-2, where the X, Y, Z coordinate positioning, (here the rail 1150 is one dimensional so as to be an X coordinate), and defining a position location. This process repeats until the PRESET location is attained, and once attained, the process moves to block 1410b-1. Alternately, block 1410b-1 is reached initially, should the robot initially reach the PRESET location.

Initially, at block 1410b-1 the PTZ orientation for the camera 1210 or other imaging apparatus of the robot 1110 is determined. If the correct PTZ orientation has not been reached, the process moves to block 1410b-2, where the PTZ adjustment to the proper orientation is made, and the PTZ location is defined. This process of block 1410b-2 repeats until the correct PTZ orientation is obtained. With the correct PTZ orientation reached, the process moves to block 1410c-1. Alternately, block 1410c-1 is reached initially, should the robot 1110 initially achieve the proper PTZ camera 1210 orientation.

At block 1410c-1 one or more reference points are identified. If not, the process moves to block 1410c-2, for application of the reference points identification algorithm, and RPIDs are defined (and recorded). The process of block 1410c-2 is repeated until the reference points are identified, and RPIDs are defined. With the reference points identified and defined, the process moves to block 1410d-1. Alternately, block 1410d-1 is reached initially, should the robot 1110 initially identify and define the necessary reference points associated with the PRESET.

At block 1410d-1, it is determined whether the ROI has been identified by analysis of the reference points, for example, a correlation between the reference points from previous image against those of the present image. If the ROI needs to be defined, the process moves to block 1410d-2, for ROI identification algorithm. Once the ROI is defined, either initially, at block 1410d-1 or at block 1401d-2, the process moves to block 1412.

At block 1412, optical positioning is evaluated and the reference points in the present image are compared against those of the reference image. Since it is unlikely that the reference points of the two images coincide completely, the process moves to block 1414 where the optical positioning/repositioning sub-process occurs.

The optical positioning/repositioning process performed in block 1414 is shown in FIG. 2F-3, to which attention is now directed. Here, a reference points on a reference image 1450, are identified and compared with corresponding identified reference points on the present image 1452. The corresponding ROI's 1450a, 1452a are then corrected, based on deviations of the reference points, making them amenable to image comparison and analysis. The optical positioning compensates for mechanical inaccuracies for achieving maximum repetition for ROI identification. From block 1414, the process moves to block 1408 to perform the preset's tasks, for example image analysis, report generation, and the like.

From block 1408, the process moves to block 1416, where the data of the image is logged, and the process returns to block 1402, from where it resumes.

FIG. 2F-4 is a general flow diagram for processes involving data collection and analysis. Initially, at block 1470, the data to be collected is defined, including, for example, data types, locations (all axes), times, scheduling, reference points, and the like. At block 1472, the robot has moved into the correct PRESET position, including the proper PTZ orientation (coordinates) to focus on the intended ROI, as defined by the process of FIGS. 2F-1 and 2F-2, so as to obtain one or more mages of the ROI. The process moves to block 1474, where a data analysis, such as those detailed below is performed, with the results provided as output, at block 1476.

Figures 1, 2G:
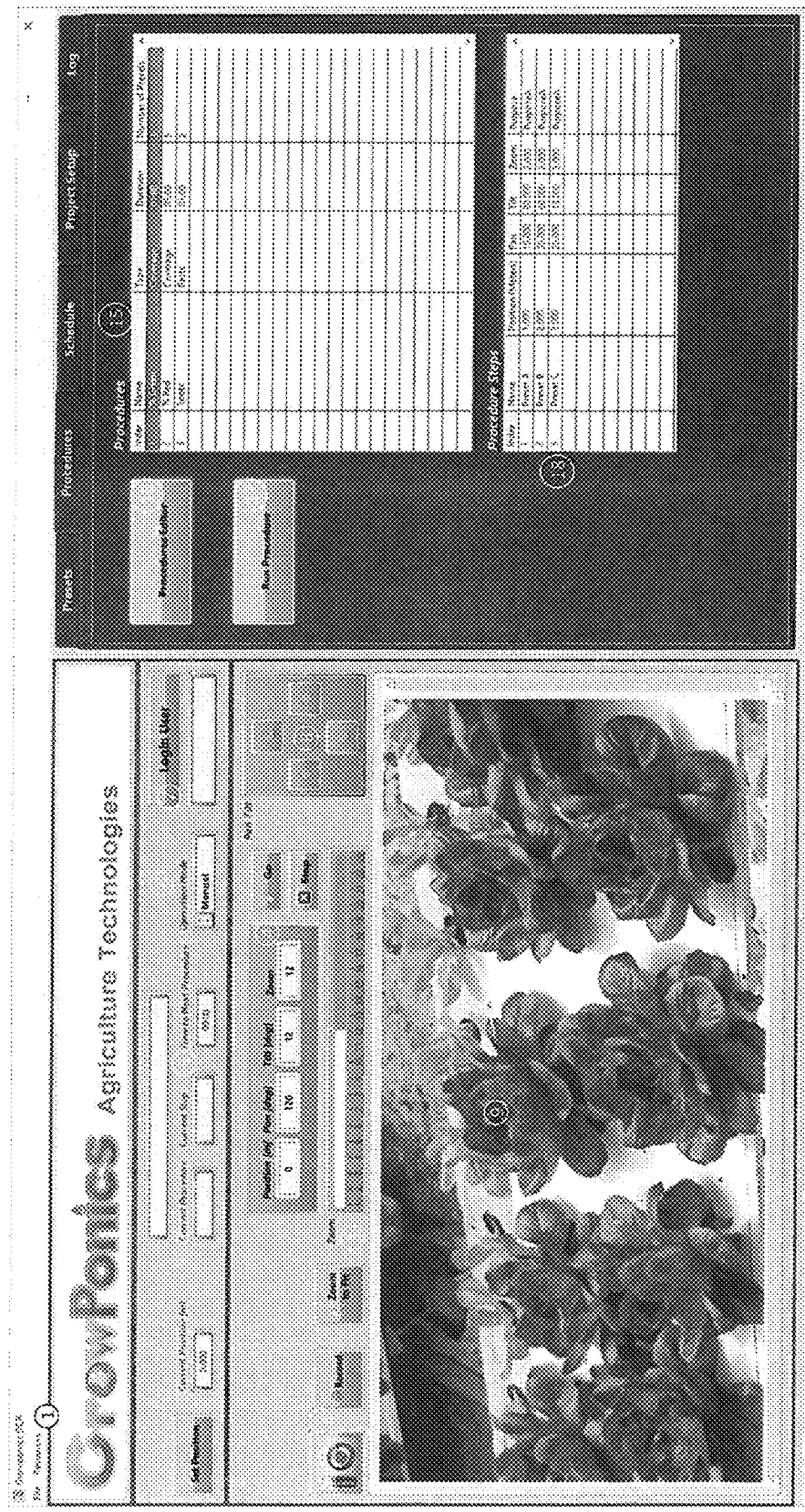
Figure 3:
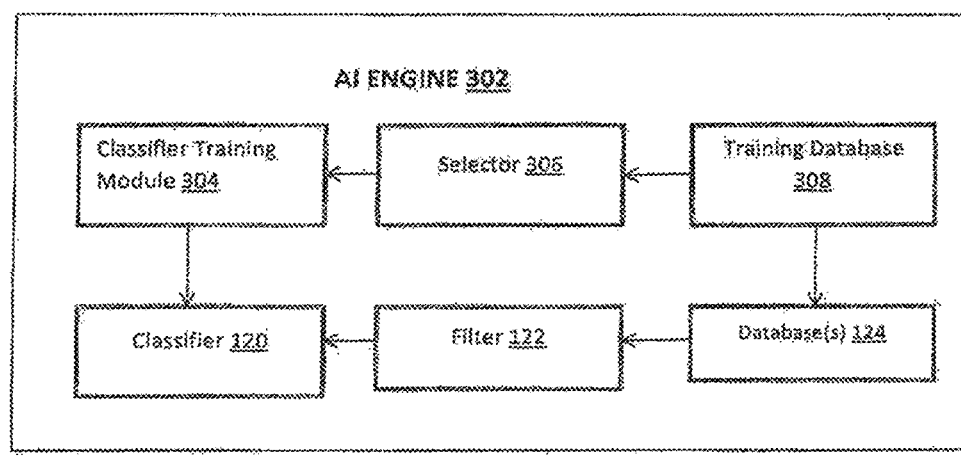

The analysis is, for example, a color analysis, to detect general health, as well as a comparison of growth rates, for example, between the present growth period and a previous growth period. Also, the robot could be trained, for example, with artificial intelligence and deep learning, to perform a color analysis to detect disease, insect infestation, lack of certain nutrients, lack of water and the like. The color analysis can also be made in water/nutrient flow pathways to detect clogging, stagnancy of the fluid, and other problems, such as algae and bacteria growing in the water/nutrient solution. FIGS. 2G-1 and 2G-2 provide screen diagrams for a color analysis in accordance with the process of FIG. 2F-2.

Additional processes including algorithms for operating the robot 1110 for data collection at the desired presets is attached to this document as Appendix C.

FIG. 3 shows the artificial intelligence (AI) engine 302 including the classifier 120, the filter 122, and database(s) 124, described above. The AI engine 302 includes a training module 304, a data selection module 306, and a training database 308. The AI engine 302 can be part of the system 100, or be in the cloud 50, or be partly in the system 100 and partly in the cloud 50.

The training module 304 analyzes selected training data, as a data set, obtained by the selector 306, from the training data base 308 in order create a model for each designated objective function. The training data used for each objective function model is selected from training data from the training database 308, which in turn, obtains its data from the database(s) 124. The training module 304 analyzes all of the training data for each objective function, and creates a model for each objective function. The classifier 120 applies these objective function models to analyze data from the database 124 (as filtered by the filter 122 for the specific objective function to be analyzed), to generate an outcome for the selected objective function.

FIG. 4A shows a rotating field system (RFS) 116a. The rotating field system 116a creates a conveyor system and mechanism to automatically rotate trays 12 that bear plants in a growing bed in order to enable, planting, spacing, inspecting, treating and harvesting at the end or ends of the bed 14 (bed "A"), thus eliminating the need for walkways between the beds 14.

The example RFS system 116a is arranged so that trays 12 are rotated automatically, inside a water bed 14 (which is, for example, a pool in which the trays 12 float, as they are moved in accordance with a rotation) as the trays 12 float on a nutrient liquid solution 16 in the bed 14. The use of such flotation allows a reliable, low maintenance, cost efficient solution and eliminates the need for use of beatings, shafts, sliding mechanisms and other mechanical fixtures for causing linear motion of trays 12.

The bed 14 includes a separation barrier (not shown) that allows for two rows 18 of trays 12, one row 18 on each side of the barrier. Two pneumatic pistons 20 (Y-pistons) push respective rows 18 of trays 12 in opposite Y-directions. Prior to movement of a row 18 by Y-piston 20 of that row 18, that row 18 includes a gap 22 where one tray 12 is missing. For example, for the right-side row 18, as a row 18 is pushed by its Y-piston 20, the last tray 12, that is nearest to that Y-piston 20, is retained by a spring arm (not shown) that prevents that tray 12, and the rest of trays 12 in that row 18, from moving back as that Y-piston 20 retracts back, leaving a vacant tray-sized gap 24 adjacent to Y-piston 20.

Two other pneumatic pistons 26 (X-Pistons) then push the first tray 12 in each row 18 into the vacant gaps (not shown), causing that tray 12 to join the other row 18 of trays 12. This is followed by the two Y-pistons 20 again pushing rows 18 of trays 12 in the Y-direction, one row 18 in the opposite direction of the other row 18. Arrows 28 show the way trays 12 are thus rotated within the bed 14. This procedure is governed, controlled, timed and synchronized by the CPU 119*a* of the controller 102, and, for example, can be started and stopped by the operator by pushing a switch.

While the system 116*a* automatically rotates trays 12 that carry the plants within the bed 14, the trays 12 do not leave the single bed 14 and are only rotated within the bed 14. The spacing can only be done manually, at one of the ends of the bed 14, during the rotation. The system 116 automatically, using the same pneumatic pistons 20, 26, both rotates trays 18 within a single bed 14 as needed and moves the trays 18 between neighboring beds in order to space the plants by inserting an empty tray 18 from a neighboring bed 14 in-between trays 18 whose plants need spacing. The spacing of the plants takes significantly less growing area as they build their biomass in their young growing stage, and thus need more growing area in their later growing stage. In order to utilize the growing area better, and increase the yields per square meter, plants are spaced differently during stages of their growth cycle.

Figures 1, 2, 4B:
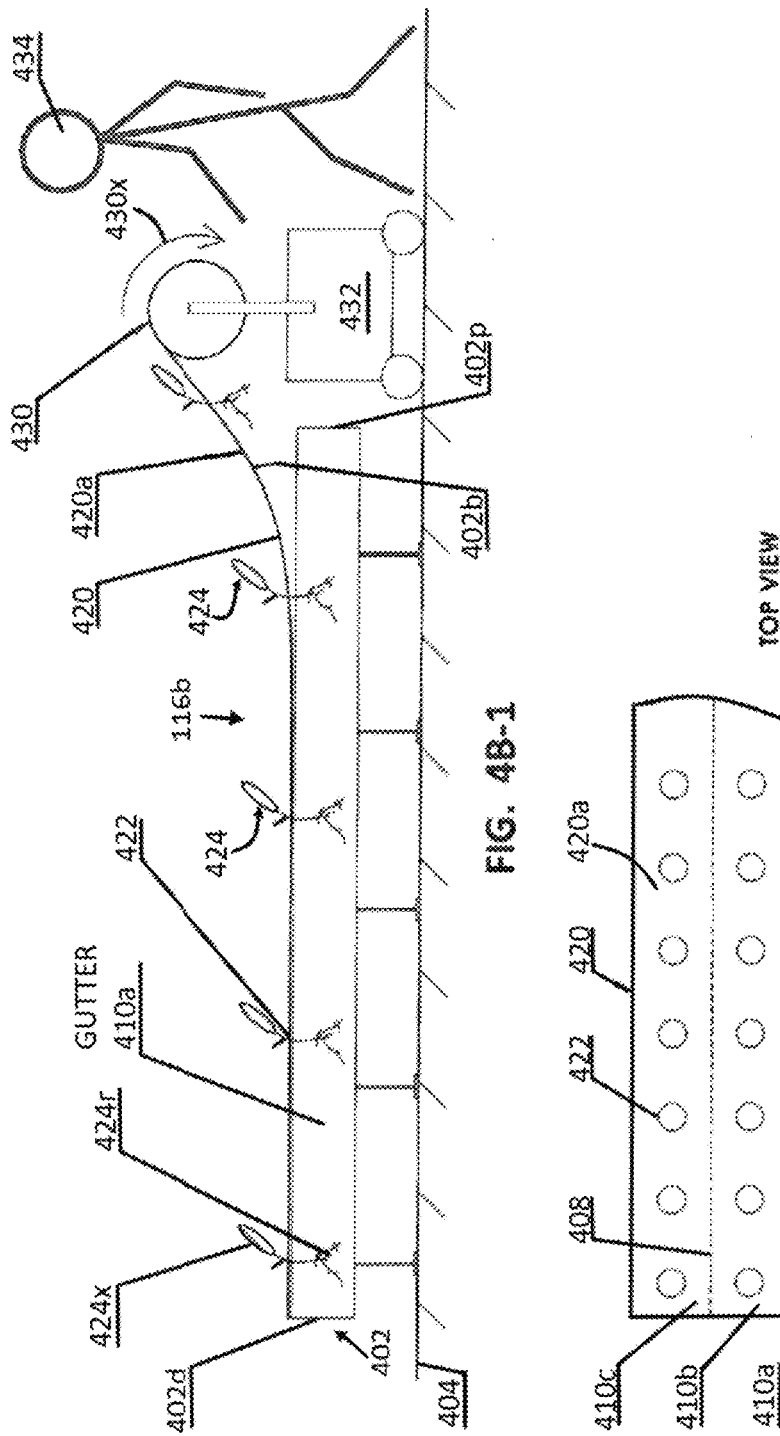

FIGS. 4B (a partial cross section of the system 116*b*) and 4C show a Nutrient Film Technique (NFT) system 116*b*. The system 116*b* is supported by a base 402, which sits on a surface 404, such as the ground. The base 402 is, for example, in the form of a tray, so as to hold liquid, such as a nutrient solution. The base 402, typically includes upward protrusions 408. These upward protrusions 408 extend longitudinally, between the distal end 402*d* and the proximal end 402*p* of the base, so as to define compartments or gutters 410*a*-410*c*, for the nutrient solution. While three gutters 410*a*-410*c* are shown, any number of gutters is sufficient.

A nutrient film 420, with openings 422, for example, formed by perforations, supports plants 424, on a first or upper side 420*a*, with the roots 424*r* of each plant 424 extending through the respective opening 422, into the respective gutter 410*a*-410*c*, so as to be feed by the nutrient solution in the gutter 410*a*-410*c*. Typically, the leafs 424*x* of the plants 424 extend beyond the upper side 420*a* of the film 420, while the roots 424*r* are in contact with the nutrient solution in the respective gutter 410*a*-410*c*. The openings 422 are apertures of a diameter sufficient to allow the roots 424*r* to extend through the film 420, beyond the second or lower side 420*b* of the film 420. The nutrient film 420 is held, for example, in a removably attachable engagement, on a take-up reel 430, mounted, for example on a portable platform 432. The take-up reel 430 can be controlled automatically, or alternately manually by an operator 434 as shown. As the operator 434 rotates the take-up reel 430 in accordance with the direction of the arrow 430*x*, plants 424 are brought closer to the operator 434 for removal and/or cutting from the nutrient film 420 for transplant or harvest.

The film 420 is, for example, a polymeric film, such as polyvinyl chloride (PVC). The nutrient solution is, for example, water, or other nutrient solution used in hydroponics.

FIGS. 5A and 5B show a hammer system 112*x*, in particular, a hammer or hammer unit 112*x*, in a first position (FIG. 5A), when the hammer 502 (for example, a metal rod, also known as a "plunger") is not in contact with the irrigation pipe 504, and a second position (FIG. 5B), where the hammer 502 is in contact (a single short contact) with the pipe 504. The single short contact is instantaneous, and downward, followed by an immediately upward movement, in the direction of the double headed arrow 505, and is made to break up biofilms 506 and other materials, which have formed inside the pipe 504. If left unattended, the biofilms can grow so as to clog irrigation openings 508, in the pipe 504, such that irrigation fluids 510, e.g., water, nutrient solutions and the like, would not reach the plants 512.

The hammer system 112*x* is automated, such that the hammer 502 is moved into and out of contact with the pipe 504 by at least one coil (electro-magnet 514 in a housing 516). The electromagnet 514 (electromagnet coil or coil) includes a top (first) coil 514*a* and a bottom (second) coil 514*b*. The repeated strikes (impacts) of the hammer 502, for example, several times per minute-on a set sequence, break up the biofilm 506 into pieces 506*x* (FIG. 5B). These biofilm pieces flow with the fluids through the pipe 504 (in the direction of the arrow 518), or leave the pipe 504 at the end of the nutrient fluid circulation pathway. The system 112*x* allows varying the frequency of the hammer 502 strikes and their intensity. The hammer unit 112*x*, for example, typically mounts to the base or tray portion of a plant holding apparatus, such as the base (tray) 402 of the apparatus of FIG. 4B-1.

Figure 6:
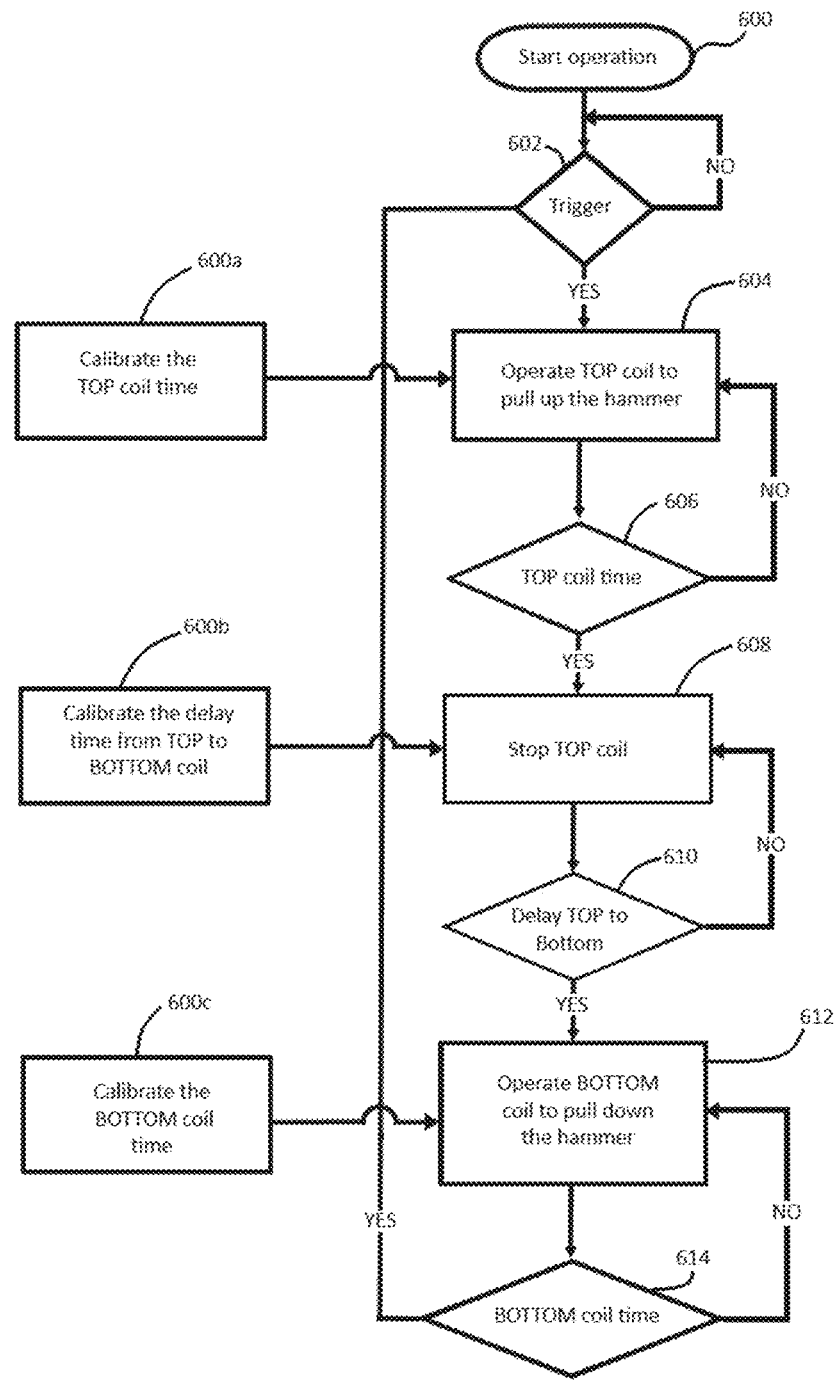

FIG. 6 shows a flow diagram of an example process for operating a hammer unit 112*x*. The process is performed, for example, automatically, and in real time.

The process begins at the START block 600. The hammer system 112*x* has been activated. Activation of the hammer system 112*x* and operation of the hammer, frequency of hammer strikes, may also be based on facility, greenhouse or farm temperatures, radiation, time of day or time of year (season). Initially, three calibrations are made. A first calibration is made for the top coil 514*a* time, at block 600*a*. A second calibration is made for delay time from the top coil 514*a* to the bottom coil 514*b*, at block 600*b*. A third calibration is made for the bottom coil 514*b* time, at block 600*c*.

From block 600, the process moves to block 602, where it is determined whether there is a trigger, for example, by a timer, or in response to a command provided by a system operator, or the like. If no, the process returns to block 602. If yes, the process moves to block 604.

At block 604, with the top coil 514*a* time calibrated (at block 600*a*), the top coil 514*a* is activated (and active) to pull up the hammer (plunger) 502. The process moves to block 606, where the top coil 514*a* is permitted to pull the hammer 502 upwards within a preset time. If no, at block 606, the process returns to block 604. If yes, at block 606, the process moves to block 608.

At block 608, with the delay time from the top coil 514*a* to the bottom coil 515*b* calibrated (at block 600*b*), the top coil 514*a* movement is stopped. The process moves to block 610, where the delay of the top coil 514*a* has met or exceeded a predetermined time (time period). If no, at block 610, the process returns to block 608. If yes, at block 610, the process moves to block 612.

At block 612, with the bottom coil 514b time calibrated (at block 600c), the bottom coil 514b is activated (and active) to pull down the hammer (plunger) 502. The process moves to block 614, where the bottom coil 514b is permitted to release the hammer 502, within a preset time, so that it moves downward, to strike the pipe. If no, at block 614, the process returns to block 612. If yes, at block 614, the process moves to block 602, from where it resumes.

The process may continue for as long as desired, until the coil 514 is turned OFF.

Appendix D, attached hereto, is an operational manual for the system 100.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments.

The terminology used herein was chosen to best explain the principles of the embodiments, the practical application or technical improvement over technologies found in the marketplace, or to enable others of ordinary skill in the art to understand the embodiments disclosed herein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A hammer system in communication with at least one conduit of an irrigation system, the at least one conduit through which fluids are delivered to vegetation, the hammer system comprising:
   a holder for holding at least one rod in a movable engagement; and
   at least one rod movable in the moveable engagement between a first position and a second position, the first position where the rod is spaced apart from the at least one conduit, and the second position where the rod contacts the at least one conduit.

2. The irrigation system of claim 1, wherein the first position includes the rod being held spaced apart from the at least one conduit, and is movable from the first position so as to be in motion when the rod to contact the at least one conduit, the rod having moved to the second position.

3. The irrigation system of claim 2, wherein the at least one contact includes the at least one rod striking the at least one conduit with a force sufficient to remove contaminants from the at least one conduit.

4. The irrigation system of claim 1, additionally comprising a controller for controlling the movement of the rod between the first position and the second position.

5. The irrigation system of claim 2, wherein the rod is moveable from the first position to the second position by gravity, upon being released from the first position.

6. The irrigation system of claim 4, wherein the rod is of a magnetic material and the hammer system additionally comprises an electromagnetic coil for receiving a lease a portion of the rod, the rod in or movable to the first position when the electromagnetic coil is active with electric current passing therethrough, and the rod movable to or in the second position when the electromagnetic coil is inactive, and electric current is not passing therethrough.

7. The irrigation system of claim 6, wherein the controller controls the electric current passing through the electromagnetic coil.

\* \* \* \* \*